United States Patent
Stenger et al.

(10) Patent No.: US 9,708,572 B2
(45) Date of Patent: *Jul. 18, 2017

(54) DETERGENT COMPOSITION COMPRISING BLUING AGENT AND CLAY SOIL REMOVAL / ANTI-REDEPOSITION AGENT

(75) Inventors: Patrick Christopher Stenger, Fairfield, OH (US); Gregory Scot Miracle, Hamilton, OH (US); Andrew Philip Moon, Tyne & Wear (GB); Brian Joseph Loughnane, Fairfield, OH (US); Sivaramakrishnan Muthukrishnan, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/313,310

(22) Filed: Dec. 7, 2011

(65) Prior Publication Data

US 2012/0129753 A1    May 24, 2012

Related U.S. Application Data

(63) Continuation of application No. PCT/US2011/057279, filed on Oct. 21, 2011, which is a continuation of application No. 12/910,258, filed on Oct. 22, 2010, now abandoned.

(51) Int. Cl.
| | |
|---|---|
| *C11D 3/42* | (2006.01) |
| *C11D 7/34* | (2006.01) |
| *C09B 31/072* | (2006.01) |
| *C09B 69/10* | (2006.01) |
| *C09B 69/00* | (2006.01) |
| *C11D 3/34* | (2006.01) |
| *C11D 11/00* | (2006.01) |

(52) U.S. Cl.
CPC .............. *C11D 3/42* (2013.01); *C09B 31/072* (2013.01); *C09B 69/00* (2013.01); *C09B 69/10* (2013.01); *C09B 69/106* (2013.01); *C11D 3/349* (2013.01); *C11D 11/0017* (2013.01)

(58) Field of Classification Search
CPC .... C11D 3/00; C11D 3/42; C11D 7/34; C09B 31/02; D06P 1/39
USPC ......... 252/186, 526, 527, 539; 510/392, 393
See application file for complete search history.

(56) References Cited

U.S. PATENT DOCUMENTS

| | | | |
|---|---|---|---|
| 3,762,859 A * | 10/1973 | Wixon et al. ............. | 8/680 |
| 4,400,320 A | 8/1983 | Keller et al. | |
| 5,332,806 A * | 7/1994 | Hurter ............... | C09B 31/072 |
| | | | 534/831 |
| 5,770,558 A | 6/1998 | Chapman et al. | |
| 6,031,023 A | 2/2000 | Carroll et al. | |
| 6,348,441 B1 * | 2/2002 | Aiken et al. ............. | 510/304 |
| 6,482,994 B2 | 11/2002 | Scheper et al. | |
| 7,910,533 B2 | 3/2011 | Somerville Roberts et al. | |
| 8,378,083 B2 | 2/2013 | Mahaffey, Jr. et al. | |
| 8,962,815 B2 | 2/2015 | Mahaffey, Jr. et al. | |
| 9,499,775 B2 | 11/2016 | Okamura et al. | |
| 2003/0054969 A1 * | 3/2003 | Fumagalli et al. ......... | 510/394 |
| 2004/0238791 A1 | 12/2004 | Champ et al. | |
| 2006/0287211 A1 * | 12/2006 | Barbizan ............ | C11D 3/001 |
| | | | 510/367 |
| 2007/0083040 A1 | 4/2007 | Hasemann | |
| 2007/0191250 A1 * | 8/2007 | Lant ............... | C11D 3/38627 |
| | | | 510/392 |
| 2011/0245132 A1 | 10/2011 | Dupont et al. | |
| 2012/0122750 A1 | 5/2012 | Stenger et al. | |
| 2012/0122751 A1 | 5/2012 | Stenger et al. | |
| 2012/0129752 A1 | 5/2012 | Stenger et al. | |

FOREIGN PATENT DOCUMENTS

| | | |
|---|---|---|
| WO | WO 98/05747 A1 | 2/1998 |
| WO | WO 2007/087257 A2 | 8/2007 |
| WO | WO 2007/093303 A1 | 8/2007 |
| WO | WO 2009/154934 A1 | 12/2009 |

OTHER PUBLICATIONS

U.S. Appl. No. 13/313,395, filed Dec. 7, 2011, Stenger et al.
U.S. Appl. No. 13/313,283, filed Dec. 7, 2011, Stenger et al.
U.S. Appl. No. 13/313,340, filed Dec. 7, 2011, Stenger et al.
International Search Report for International Application Serial No. PCT/US2011/057262, mailed Feb. 29, 2012, 9 pages.
International Search Report for International Application Serial No. PCT/US2011/057264, mailed Feb. 29, 2012, 9 pages.
International Search Report for International Application Serial No. PCT/US2011/057270, mailed Mar. 5, 2012, 9 pages.
International Search Report for International Application Serial No. PCT/US2011/057279, mailed Feb. 29, 2012, 9 pages.
Oakes, John and Dixon, Sarah—"Adsorption of Dyes to Cotton and Inhibition by Polymers"—Coloration Technology, Society of Dyers and Colourists, vol. 119, Mar. 3, 2003, pp. 140-149.

* cited by examiner

*Primary Examiner* — Gregory R Delcotto
*Assistant Examiner* — Preeti Kumar
(74) *Attorney, Agent, or Firm* — John T. Dipre; Steven W. Miller

(57) ABSTRACT

A laundry detergent composition having: (a) detersive surfactant; (b) bluing agent, and (c) a clay and soil removal/anti-redeposition agent; and (d) optionally, one or more additional laundry detergent ingredients.

10 Claims, No Drawings

DETERGENT COMPOSITION COMPRISING BLUING AGENT AND CLAY SOIL REMOVAL / ANTI-REDEPOSITION AGENT

CROSS REFERENCE TO RELATED APPLICATION(S)

This application is a continuation of International Application No. PCT/US2011/57279, filed Oct. 21, 2011, which is a continuation of U.S. application Ser. No. 12/910,258, filed Oct. 22, 2010.

FIELD OF THE INVENTION

The present invention relates to a detergent composition comprising bluing agent and polymer. The composition of the present invention provides good cleaning performance on cotton fabric.

BACKGROUND OF THE INVENTION

As textile substrates age, their color tends to fade or yellow due to exposure to light, air, soil, and natural degradation of the fibers that comprise the substrates. To counteract this unwanted effect, laundry detergent manufacturers incorporate hueing agents into their products. Thus, the purpose of hueing agents is typically to visually brighten these textile substrates and counteract the fading and yellowing of the textile substrates.

Hueing agents are typically formulated into solid laundry detergent compositions, especially free-flowing particulate laundry detergent compositions that comprise polymers, such as clay and soil removal/anti-redeposition agents. Such polymers whilst contributing to good cleaning on a wide variety of fabric types unfortunately can negatively affect the performance of hueing agents especially on cotton fabrics.

The Inventors have found that by using a specific hueing agent, herein referred to as bluing agent, in accordance with the present invention, in combination with specific clay and soil removal/anti-redeposition agents, a laundry detergent composition can be provided having excellent whiteness performance on cotton fabric.

SUMMARY OF THE INVENTION

The present invention provides a laundry detergent composition comprising:
(a) detersive surfactant;
(b) bluing agent, wherein the bluing agent has the following structure:

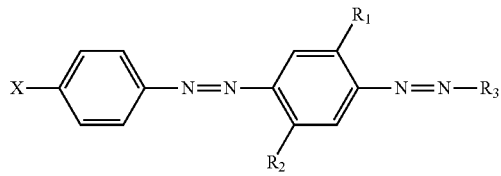

wherein:
$R_1$ and $R_2$ are independently selected from the group consisting of: H; alkyl; alkoxy; alkyleneoxy; alkyl capped alkyleneoxy; urea; and amido;
$R_3$ is a substituted aryl group;

X is a substituted group comprising sulfonamide moiety and optionally an alkyl and/or aryl moiety, and wherein the substituent group comprises at least one alkyleneoxy chain that comprises at least four alkyleneoxy moieties; and
(c) a clay and soil removal/anti-redeposition agent selected from the group consisting of:
(I) co-polymers comprising:
(i) from 50 to less than 98 wt % structural units derived from one or more monomers comprising carboxyl groups;
(ii) from 1 to less than 49 wt % structural units derived from one or more monomers comprising sulfonate moieties; and
(iii) from I to 49 wt % structural units derived from one or more types of monomers selected from ether bond-containing monomers represented by formulas (I) and (II):

formula (I)

wherein in formula (I), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group;

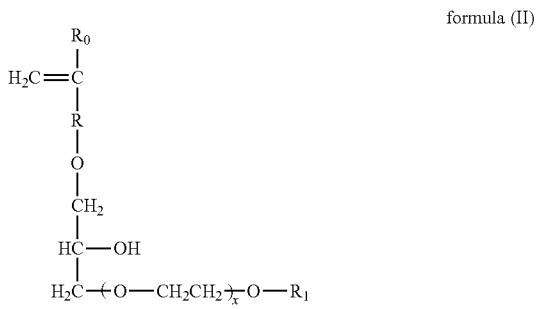

formula (II)

in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group;
(II) combinations thereof; and
(d) optionally, one or more additional laundry detergent ingredients.

DESCRIPTION

Laundry detergent composition: Typically, the composition is a fully formulated laundry detergent composition, not a portion thereof such as a spray-dried or agglomerated particle that only forms part of the laundry detergent composition. However, it is within the scope of the present invention for an additional rinse additive composition (e.g. fabric conditioner or enhancer), or a main wash additive composition (e.g. bleach additive) to also be used in combination with the laundry detergent composition during the method of the present invention. Although, it may be preferred that bleach additive composition is used in combination with the laundry detergent composition during the method of the present invention. The composition can be a solid laundry detergent composition.

Typically, the composition comprises a plurality of chemically different particles, such as spray-dried base detergent particles and/or agglomerated base detergent particles and/or extruded base detergent particles, in combination with one or more, typically two or more, or three or more, or four or more, or five or more, or six or more, or even ten or more particles selected from: surfactant particles, including surfactant agglomerates, surfactant extrudates, surfactant needles, surfactant noodles, surfactant flakes; polymer particles such as cellulosic polymer particles, polyester particles, polyamine particles, terephthalate polymer particles, polyethylene glycol polymer particles; builder particles, such as sodium carbonate and sodium silicate co-builder particles, phosphate particles, zeolite particles, silicate salt particles, carbonate salt particles; filler particles such as sulphate salt particles; dye transfer inhibitor particles; dye fixative particles; bleach particles, such as percarbonate particles, especially coated percarbonate particles, such as percarbonate coated with carbonate salt, sulphate salt, silicate salt, borosilicate salt, or any combination thereof, perborate particles, bleach catalyst particles such as transition metal bleach catalyst particles, or oxaziridinium-based bleach catalyst particles, pre-formed peracid particles, especially coated pre-formed peracid particles, and co-bleach particles of bleach activator, source of hydrogen peroxide and optionally bleach catalyst; bleach activator particles such as oxybenzene sulphonate bleach activator particles and tetra acetyl ethylene diamine bleach activator particles; chelant particles such as chelant agglomerates; hueing dye particles; brightener particles; enzyme particles such as protease prills, lipase prills, cellulase prills, amylase prills, mannanase prills, pectate lyase prills, xyloglucanase prills, bleaching enzyme prills, cutinase prills and co-prills of any of these enzymes; clay particles such as montmorillonite particles or particles of clay and silicone; flocculant particles such as polyethylene oxide particles; wax particles such as wax agglomerates; perfume particles such as perfume microcapsules, especially melamine formaldehyde-based perfume microcapsules, starch encapsulated perfume accord particles, and pro-perfume particles such as Schiff base reaction product particles; aesthetic particles such as coloured noodles or needles or lamellae particles, and soap rings including coloured soap rings; and any combination thereof.

Detergent ingredients: The composition typically comprises detergent ingredients. Suitable detergent ingredients include: bluing agent; detersive surfactants including anionic detersive surfactants, non-ionic detersive surfactants, cationic detersive surfactants, zwitterionic detersive surfactants, amphoteric detersive surfactants, and any combination thereof; polymers including carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof; builders including zeolites, phosphates, citrate, and any combination thereof; buffers and alkalinity sources including carbonate salts and/or silicate salts; fillers including sulphate salts and bio-filler materials; bleach including bleach activators, sources of available oxygen, pre-formed peracids, bleach catalysts, reducing bleach, and any combination thereof; chelants; photobleach; hueing agents; brighteners; enzymes including proteases, amylases, cellulases, lipases, xylogucanases, pectate lyases, mannanases, bleaching enzymes, cutinases, and any combination thereof; fabric softeners including clay, silicones, quaternary ammonium fabric-softening agents, and any combination thereof; flocculants such as polyethylene oxide; perfume including starch encapsulated perfume accords, perfume microcapsules, perfume loaded zeolites, schif base reaction products of ketone perfume raw materials and polyamines, blooming perfumes, and any combination thereof; aesthetics including soap rings, lamellar aesthetic particles, geltin beads, carbonate and/or sulphate salt speckles, coloured clay, and any combination thereof: and any combination thereof.

Bluing agent. The composition compises a bluing agent having the following structure:

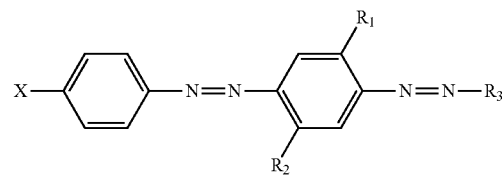

wherein: $R_1$ and $R_2$ are independently selected from the group consisting of: H; alkyl; alkoxy; alkyleneoxy; alkyl capped alkyleneoxy; urea; and amido; $R_3$ is a substituted aryl group; X is a substituted group comprising sulfonamide moiety and optionally an alkyl and/or aryl moiety, and wherein the substituent group comprises at least one alkyleneoxy chain that comprises at least four alkyleneoxy moieties.

Suitable bluing agents have the following structure:
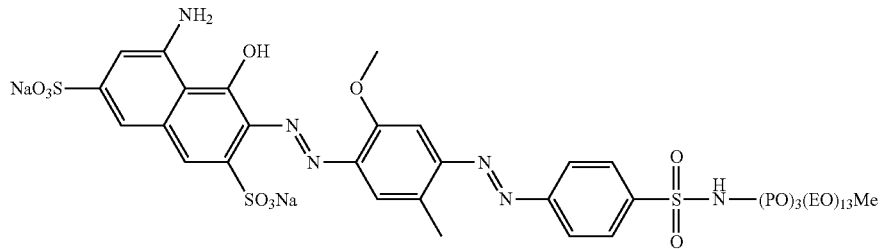
Formula BA1
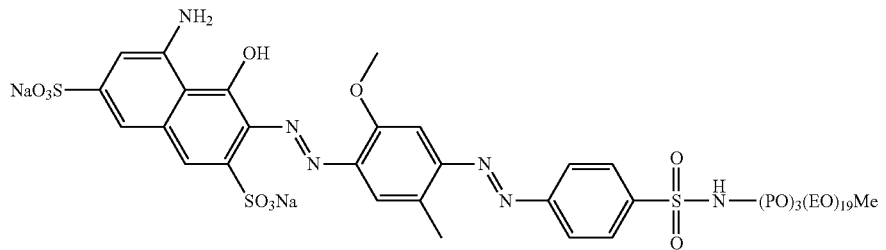
Formula BA2
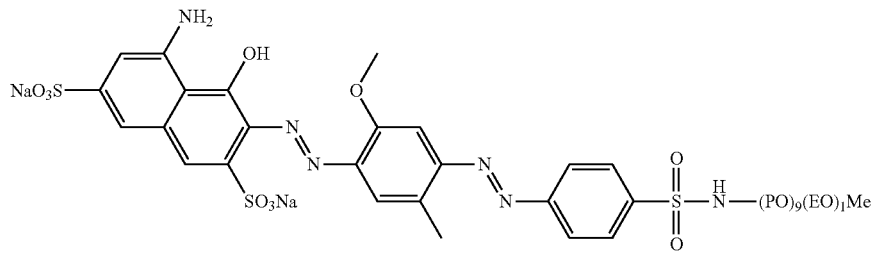
Formula BA3
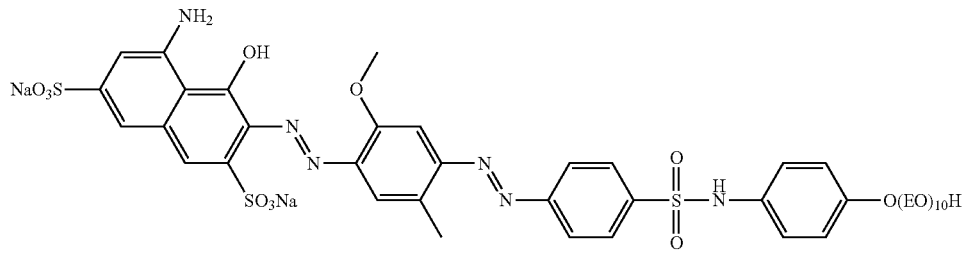
Formula BA6
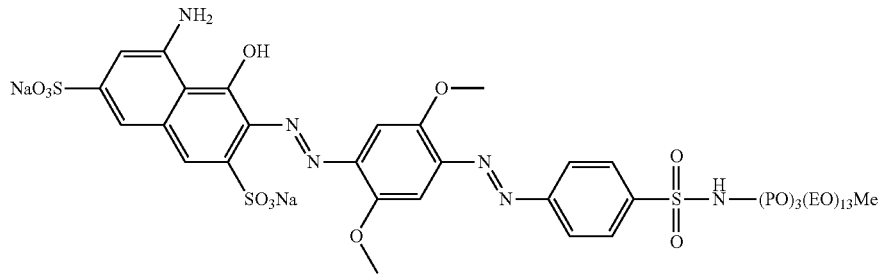
Formula BA10
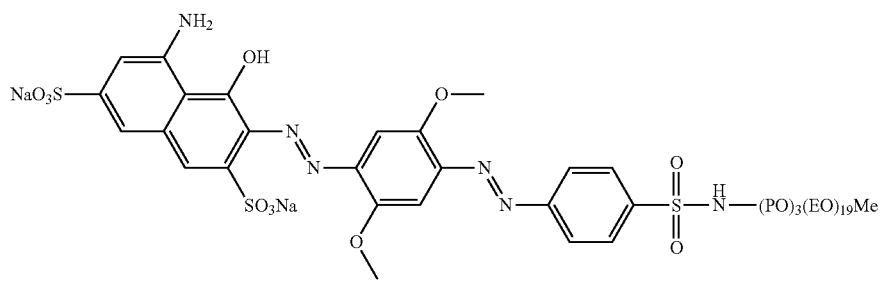
Formula BA11

-continued
Formula BA12
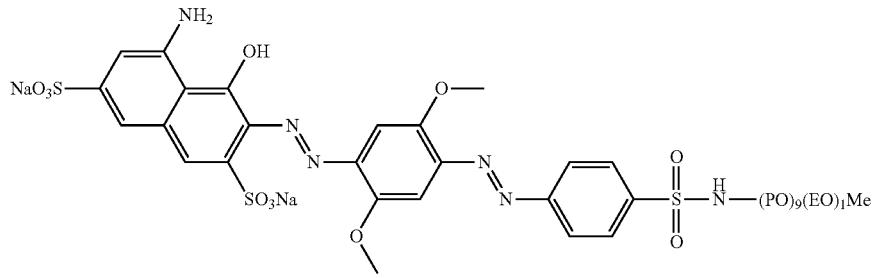
Formula BA15
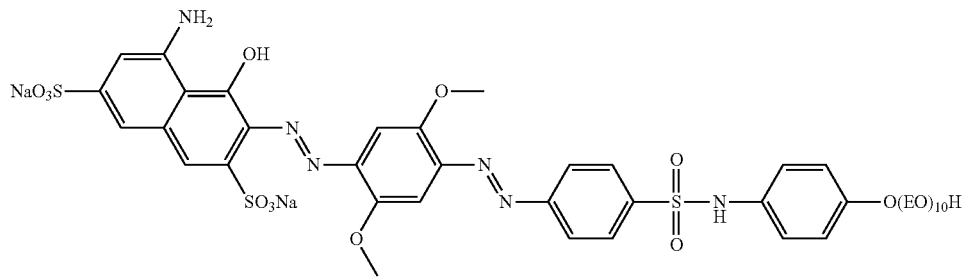
Formula BA19
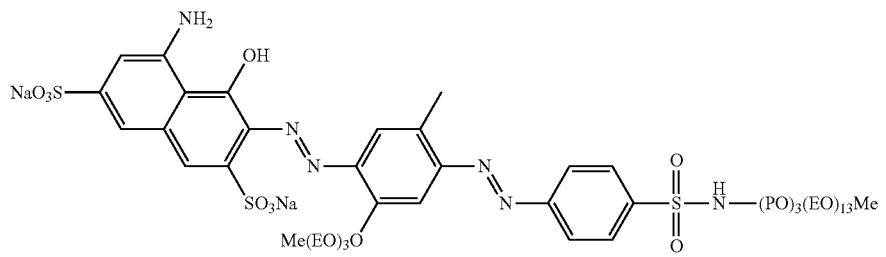
Formula BA20
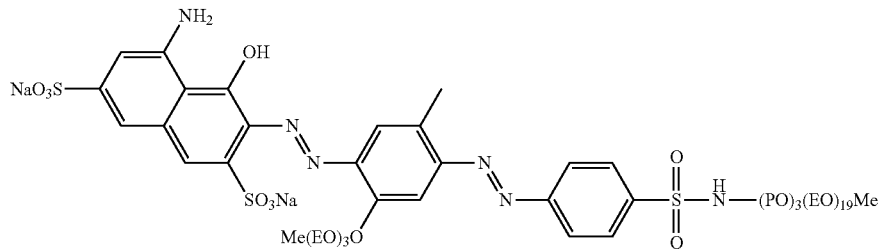
Formula BA21
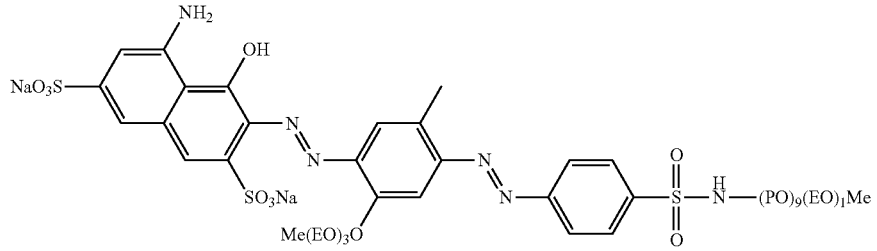
Formula BA24
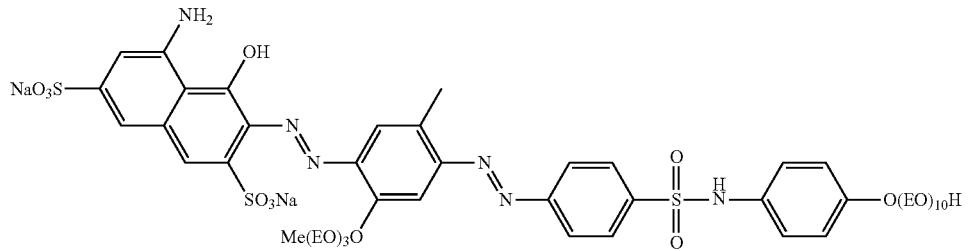

-continued
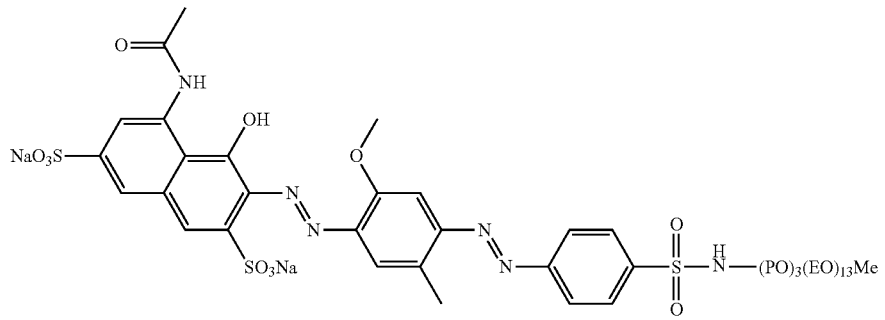
Formula BA28
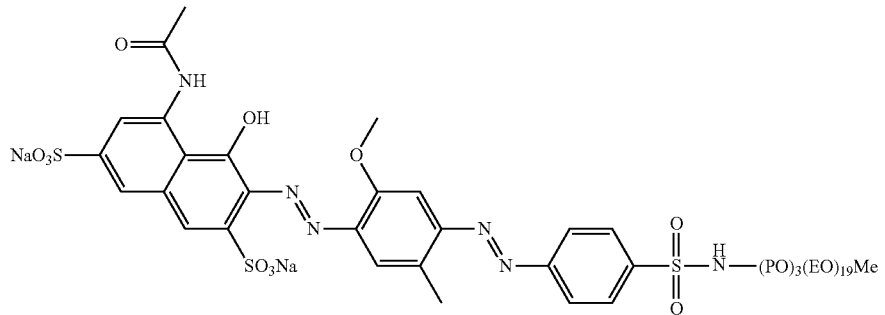
Formula BA29
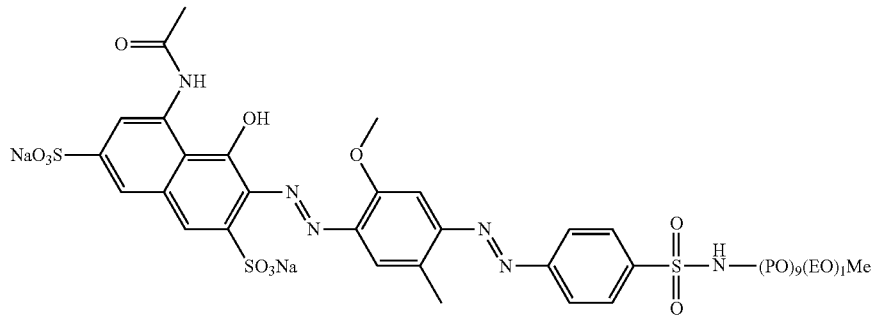
Formula BA30
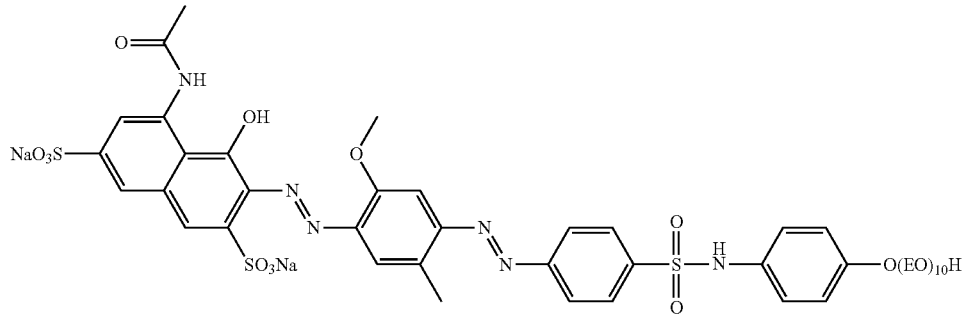
Formula BA33
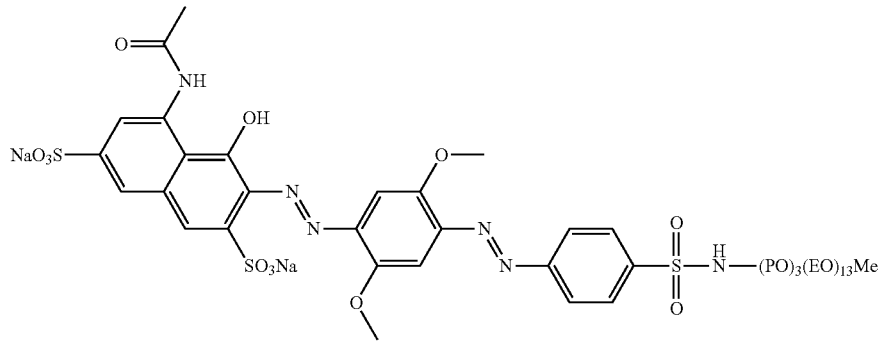
Formula BA37

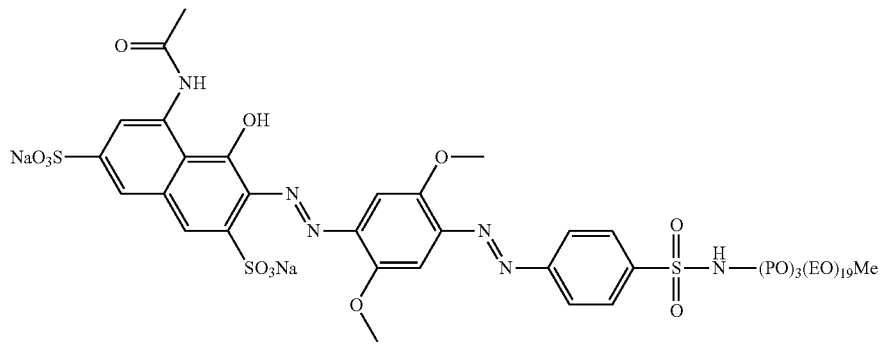
Formula BA38
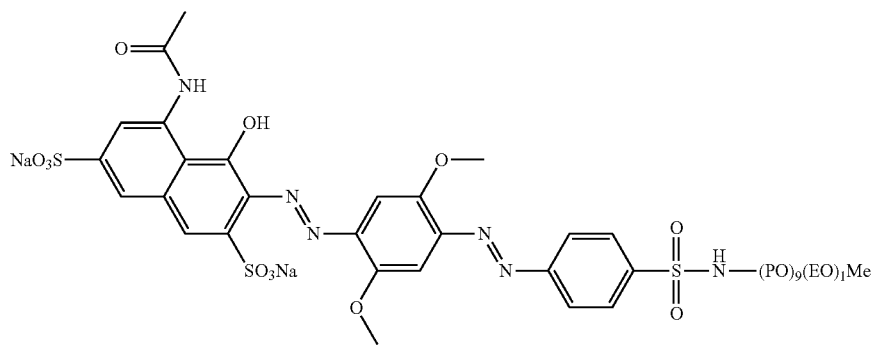
Formula BA39
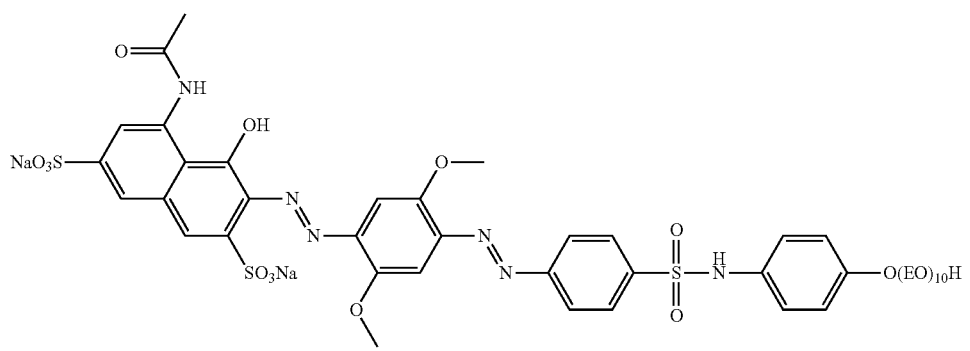
Formula BA42
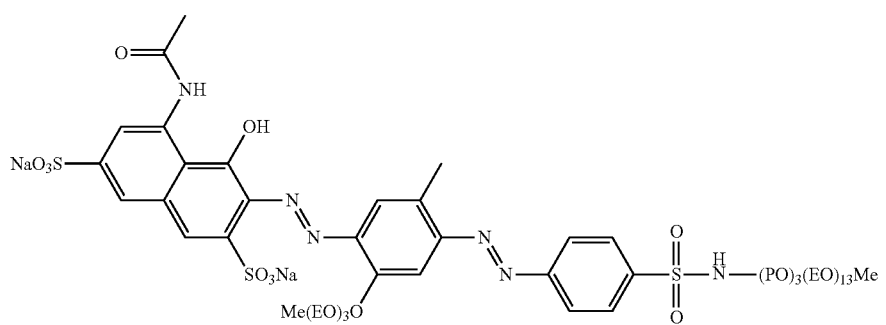
Formula BA46

-continued
Formula BA47
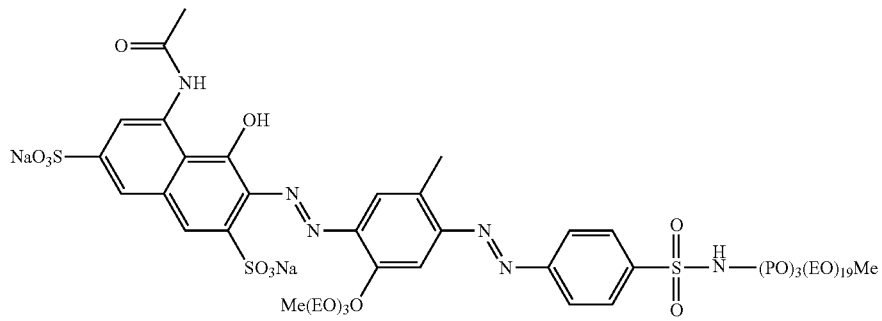
Formula BA48
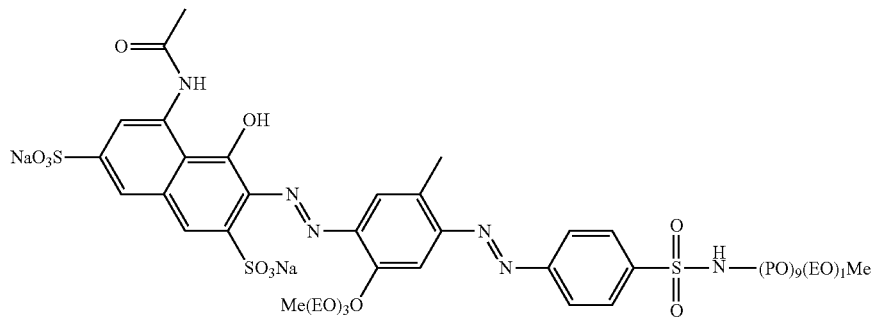
Formula BA51
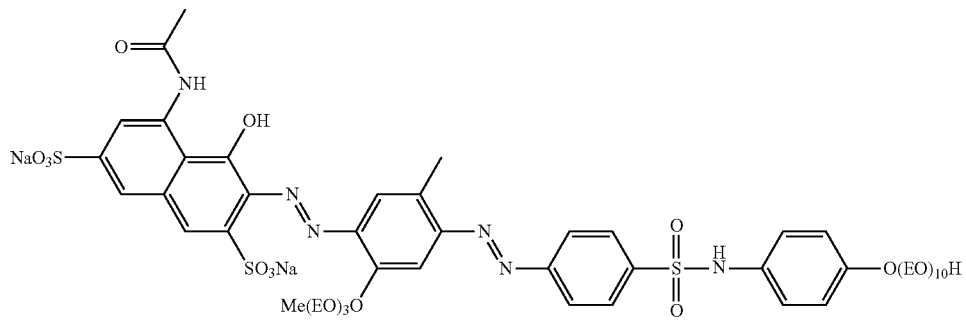
Formula BA55
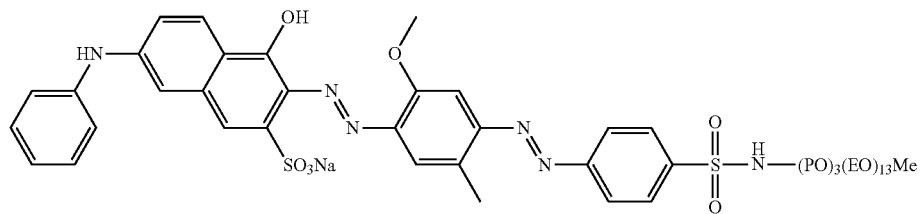
Formula BA56
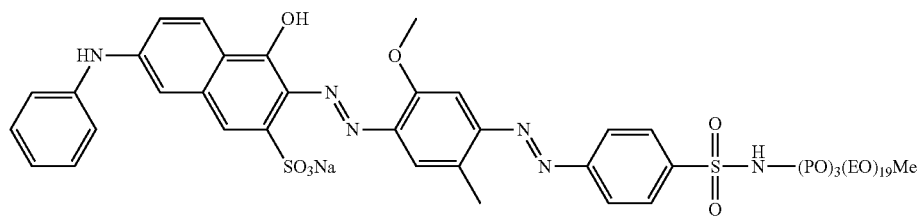
Formula BA57
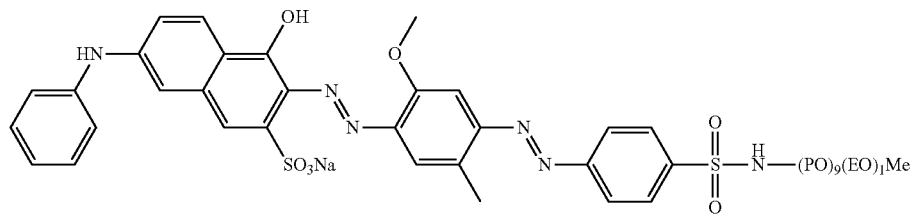

-continued
Formula BA60
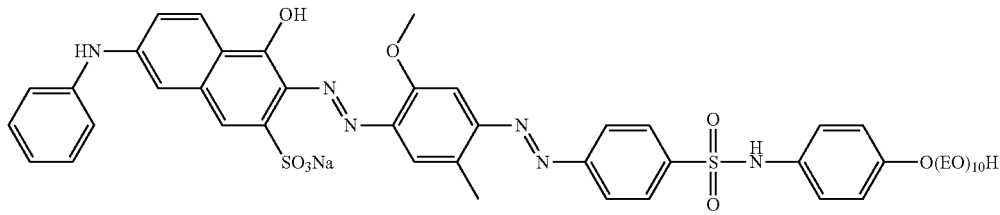
Formula BA64
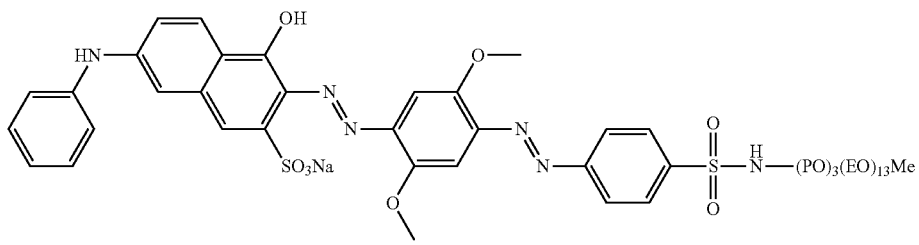
Formula BA65
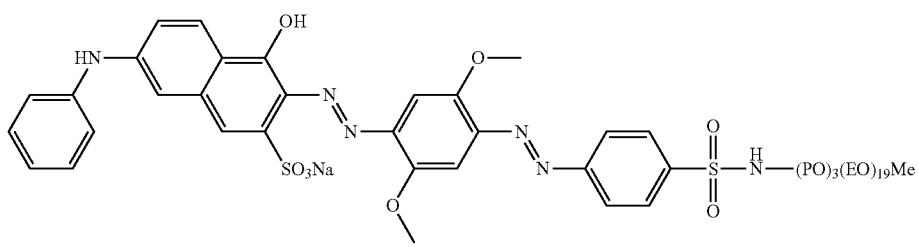
Formula BA66
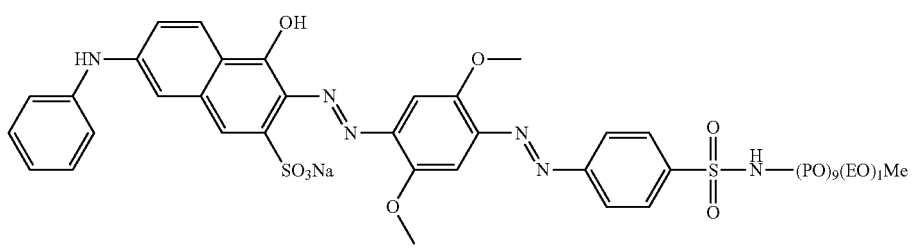
Formula BA69
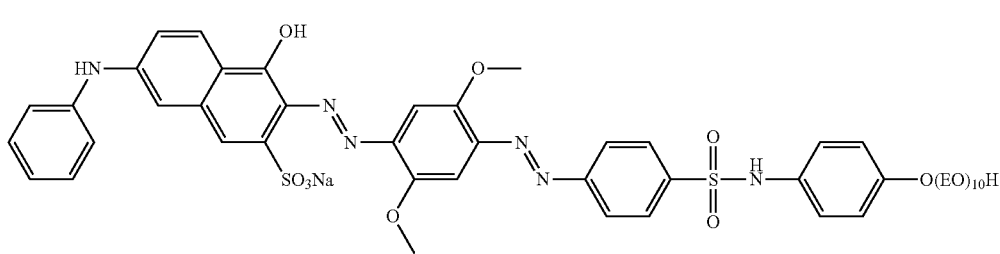
Formula BA73
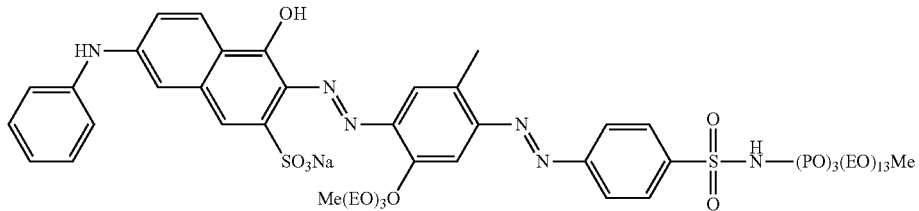
Formula BA74
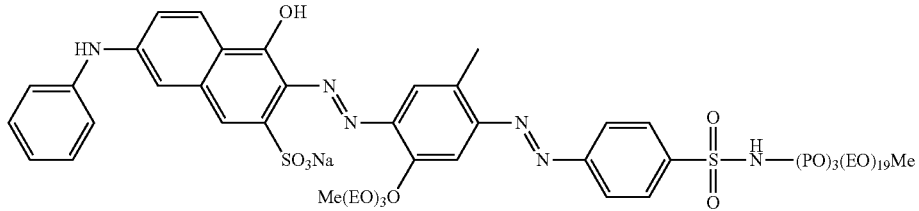

-continued

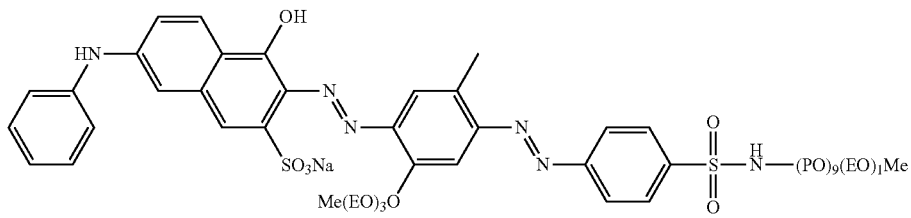
Formula BA75

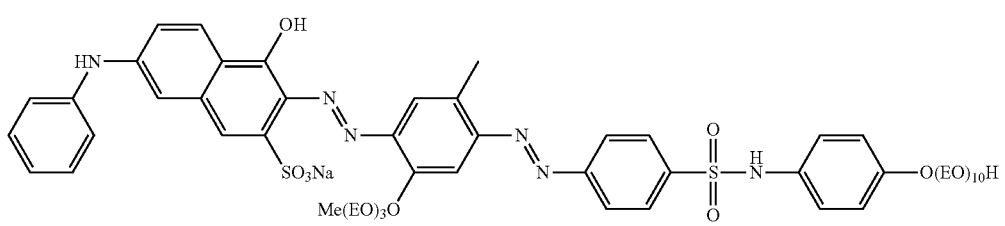
Formula BA78

A clay and soil removal/anti-redeposition agent: Suitable clay and soil removal/anti-redeposition agents are co-polymers comprising:
(i) from 50 to less than 98 wt % structural units derived from one or more monomers comprising carboxyl groups; (ii) from 1 to less than 49 wt % structural units derived from one or more monomers comprising sulfonate moieties; and (iii) from 1 to 49 wt % structural units derived from one or more types of monomers selected from ether bond-containing monomers represented by formulas (I) and (II):

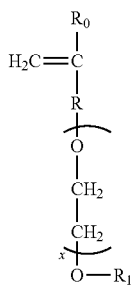
formula (I)

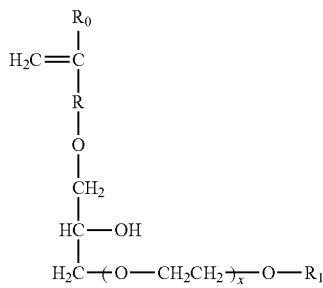
formula (II)

in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

C.I. fluorescent brightener 260. The composition may comprise C.I. fluorescent brightener 260 having the following structure:

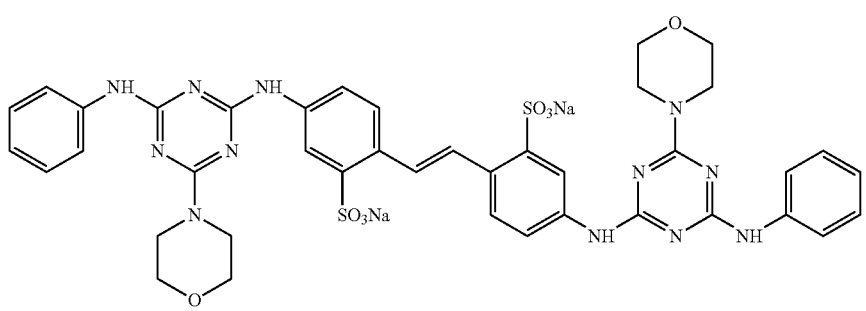

wherein in formula (I), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group;

wherein the C.I. fluorescent brightener 260 is either: (i) predominantly in alpha-crystalline form; or (ii) predominantly in beta-crystalline form and having a weight average primary particle size of from 3 to 30 micrometers. Predominantly typically means comprises at least 50 wt %, or comprises at least 60 wt %, or at least 70 wt %, or at least 80 wt %, or at least 90 wt %, to 100 wt %, or comprises 100 wt %.

Detersive surfactant: The composition comprises detersive surfactant. Suitable detersive surfactants include anionic detersive surfactants, non-ionic detersive surfactant, cationic detersive surfactants, zwitterionic detersive surfactants, amphoteric detersive surfactants, and any combination thereof.

Anionic detersive surfactant: Suitable anionic detersive surfactants include sulphate and sulphonate detersive surfactants.

Suitable sulphonate detersive surfactants include alkyl benzene sulphonate, such as $C_{10-13}$ alkyl benzene sulphonate. Suitable alkyl benzene sulphonate (LAS) is obtainable, or even obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. Another suitable anionic detersive surfactant is alkyl benzene sulphonate that is obtained by DETAL catalyzed process, although other synthesis routes, such as HF, may also be suitable.

Suitable sulphate detersive surfactants include alkyl sulphate, such as $C_{8-18}$ alkyl sulphate, or predominantly $C_{12}$ alkyl sulphate. The alkyl sulphate may be derived from natural sources, such as coco and/or tallow. Alternative, the alkyl sulphate may be derived from synthetic sources such as $C_{12-15}$ alkyl sulphate.

Another suitable sulphate detersive surfactant is alkyl alkoxylated sulphate, such as alkyl ethoxylated sulphate, or a $C_{8-18}$ alkyl alkoxylated sulphate, or a $C_{8-18}$ alkyl ethoxylated sulphate. The alkyl alkoxylated sulphate may have an average degree of alkoxylation of from 0.5 to 20, or from 0.5 to 10. The alkyl alkoxylated sulphate may be a $C_{8-18}$ alkyl ethoxylated sulphate, typically having an average degree of ethoxylation of from 0.5 to 10, or from 0.5 to 7, or from 0.5 to 5 or from 0.5 to 3.

The alkyl sulphate, alkyl alkoxylated sulphate and alkyl benzene sulphonates may be linear or branched, substituted or un-substituted.

The anionic detersive surfactant may be a mid-chain branched anionic detersive surfactant, such as a mid-chain branched alkyl sulphate and/or a mid-chain branched alkyl benzene sulphonate. The mid-chain branches are typically $C_{1-4}$ alkyl groups, such as methyl and/or ethyl groups.

Another suitable anionic detersive surfactant is alkyl ethoxy carboxylate.

The anionic detersive surfactants are typically present in their salt form, typically being complexed with a suitable cation. Suitable counter-ions include $Na^+$ and $K^+$, substituted ammonium such as $C_1$-$C_6$ alkanolammnonium such as mono-ethanolamine (MEA) tri-ethanolamine (TEA), di-ethanolamine (DEA), and any mixture thereof.

Non-ionic detersive surfactant: Suitable non-ionic detersive surfactants are selected from the group consisting of: $C_8$-$C_{15}$ alkyl ethoxylates, such as, NEODOL® non-ionic surfactants from Shell; $C_5$-$C_{12}$ alkyl phenol alkoxylates wherein optionally the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$ mid-chain branched alkyl alkoxylates, typically having an average degree of alkoxylation of from 1 to 30; alkylpolysaccharides, such as alkylpolyglycosides; polyhydroxy fatty acid amides; ether capped poly(oxyalkylated) alcohol surfactants; and mixtures thereof.

Suitable non-ionic detersive surfactants are alkyl polyglucoside and/or an alkyl alkoxylated alcohol.

Suitable non-ionic detersive surfactants include alkyl alkoxylated alcohols, such as $C_{8-18}$ alkyl alkoxylated alcohol, or a $C_{8-18}$ alkyl ethoxylated alcohol. The alkyl alkoxylated alcohol may have an average degree of alkoxylation of from 0.5 to 50, or from 1 to 30, or from 1 to 20, or from 1 to 10. The alkyl alkoxylated alcohol may be a $C_{8-18}$ alkyl ethoxylated alcohol, typically having an average degree of ethoxylation of from 1 to 10, or from 1 to 7, or from 1 to 5, or from 3 to 7. The alkyl alkoxylated alcohol can be linear or branched, and substituted or un-substituted.

Suitable nonionic detersive surfactants include secondary alcohol-based detersive surfactants having the formula:

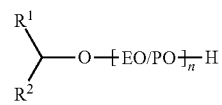

wherein $R^1$=linear or branched, substituted or unsubstituted, saturated or unsaturated $C_{2-8}$ alkyl;
wherein $R^2$=linear or branched, substituted or unsubstituted, saturated or unsaturated $C_{2-8}$ alkyl,
wherein the total number of carbon atoms present in $R^1+R^2$ moieties is in the range of from 7 to 13;
wherein EO/PO are alkoxy moieties selected from ethoxy, propoxy, or mixtures thereof, optionally the EO/PO alkoxyl moieties are in random or block configuration;
wherein n is the average degree of alkoxylation and is in the range of from 4 to 10.

Other suitable non-ionic detersive surfactants include EO/PO block co-polymer surfactants, such as the Plurafac® series of surfactants available from BASF, and sugar-derived surfactants such as alkyl N-methyl glucose amide.

Cationic detersive surfactant: Suitable cationic detersive surfactants include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

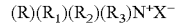

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, such as chloride; sulphate; and sulphonate. Suitable cationic detersive surfactants are mono-$C_{6-18}$ alkyl mono-hydroxyethyl di-methyl quaternary ammonium chlorides. Suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Zwitterionic and/or amphoteric detersive surfactant: Suitable zwitterionic and/or amphoteric detersive surfactants include amine oxide such as dodecyldimethylamine N-oxide, alkanolamine sulphobetaines, coco-amidopropyl betaines, HN$^+$—R—CO$_2^-$ based surfactants, wherein R can be any bridging group, such as alkyl, alkoxy, aryl or amino acids.

Polymer: Suitable polymers include carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof.

Random graft co-polymers: Suitable random graft co-polymers comprising: (i) hydrophilic backbone comprising polyethylene glycol; and (ii) hydrophobic side chain(s) selected from the group consisting of: C$_4$-C$_{25}$ alkyl group, polypropylene, polybutylene, vinyl ester of a saturated C$_1$-C$_6$ mono-carboxylic acid, C$_1$-C$_6$ alkyl ester of acrylic or methacrylic acid, and mixtures thereof. Suitable polyethylene glycol polymers have a polyethylene glycol backbone with random grafted polyvinyl acetate side chains. The average molecular weight of the polyethylene glycol backbone can be in the range of from 2,000 Da to 20,000 Da, or from 4,000 Da to 8,000 Da. The molecular weight ratio of the polyethylene glycol backbone to the polyvinyl acetate side chains can be in the range of from 1:1 to 1:5, or from 1:1.2 to 1:2. The average number of graft sites per ethylene oxide units can be less than 1, or less than 0.8, the average number of graft sites per ethylene oxide units can be in the range of from 0.5 to 0.9, or the average number of graft sites per ethylene oxide units can be in the range of from 0.1 to 0.5, or from 0.2 to 0.4. A suitable polyethylene glycol polymer is Sokalan HP22.

Polyester soil release polymers: Suitable polyester soil release polymers include polyester soil release polymers have a structure as defined by one of the following structures (I), (II) or (III):

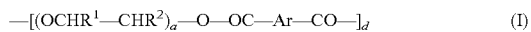
$$-[(OCHR^1-CHR^2)_a-O-OC-Ar-CO-]_d \quad (I)$$

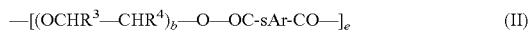
$$-[(OCHR^3-CHR^4)_b-O-OC\text{-sAr-}CO-]_e \quad (II)$$

$$-[(OCHR^5-CHR^6)_c-OR^7]_f \quad (III)$$

wherein:
a, b and c are from 1 to 200;
d, e and f are from 1 to 50;
Ar is a 1,4-substituted phenylene;
sAr is 1,3-substituted phenylene substituted in position 5 with SO$_3$Me;
Me is H, Na, Li, K, Mg/2, Ca/2, Al/3, ammonium, mono-, di-, tri-, or tetraalkylammonium wherein the alkyl groups are C$_1$-C$_{18}$ alkyl or C$_2$-C$_{10}$ hydroxyalkyl, or any mixture thereof;
R$^1$, R$^2$, R$^3$, R$^4$, R$^5$ and R$^6$ are independently selected from H or C$_1$-C$_{18}$ n- or iso-alkyl; and
R$^7$ is a linear or branched C$_1$-C$_{18}$ alkyl, or a linear or branched C$_2$-C$_{30}$ alkenyl, or a cycloalkyl group with 5 to 9 carbon atoms, or a C$_8$-C$_{30}$ aryl group, or a C$_6$-C$_{30}$ arylalkyl group. Suitable polyester soil release polymers are terephthalate polymers having the structure of formula (I) or (II) above.

Suitable polyester soil release polymers include the Repel-o-tex series of polymers such as Repel-o-tex SF2 (Rhodia) and/or the Texcare series of polymers such as Texcare SRA300 (Clariant).

Substituted cellulose: Suitable substituted cellulose include cellulosic polymers having a degree of substitution (DS) of from 0.01 to 0.99 and a degree of blockiness (DB) such that either DS+DB is of at least 1.00 or DB+2DS−DS$^2$ is at least 1.20.

As used herein, the term "celluloses" includes natural celluloses and synthetic celluloses. Celluloses can be extracted from plants or produced by microorganisms.

The substituted cellulose comprises a cellulose backbone consisting essentially of glucose units.

The degree of substitution, DS, of the substituted cellulose is of from 0.01 to 0.99. The sum of the degree of substitution and the degree of blockiness, DS+DB, of the substituted cellulose may be of at least 1. The DB+2DS−DS$^2$ of the substituted cellulose may be of at least 1.10.

The substituted cellulose may be substituted with identical or different substituents.

The composition of the invention may comprise at least 0.001%, or even at least 0.01% by weight of substituted cellulose. In particular the composition may comprise from 0.03% to 20%, especially from 0.1 to 10, or even from 0.3 to 3, for example from 1 to 1.5% by weight of substituted cellulose.

The substituted cellulose comprises unsubstituted glucose units. Unsubstituted glucose units are glucose units having all their hydroxyl groups remaining unsubstituted. In the substituted cellulose, the weight ratio of unsubstituted glucose units to the total number of glucose units may be comprised between 0.01 to 0.99.

The substituted cellulose comprises substituted glucose units. Substituted glucose units are glucose units having at least one of their hydroxyl groups being substituted. In the substituted cellulose, the weight ratio of substituted glucose units to the total number of glucose units may be comprised between 0.01 to 0.99.

The cellulose backbone is substantially linear. By substantially linear it is to be understood that at least 97%, for example at least 99% (by weight), or all the glucose units of the polymer are in the main chain of the cellulose backbone.

Celluloses have a substantially β-1,4 linked backbone. By substantially β-1,4 linked backbone it is to be understood that at least 97%, for example at least 99% (by weight), or all the glucose units of the polymer are bounded with β-1,4 linkage. When present, the remaining glucose units of the cellulose backbone may be bounded in a variety of ways, such as α- or β- and 1-2, 1-3, 1-4, 1-6 or 2-3 linkages and mixtures thereof.

The cellulose backbone consists essentially of glucose units. Consisting essentially of glucose units should be understood as comprising more than 95% or 97%, for example more than 99%, or even comprising 100% by weight of glucose units.

A monomer of cellulose which is joined to other cellulose monomers through β-1,4 linkages is shown below in figure (I).

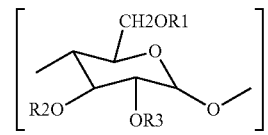

Figure (I)

R1, R2 and R3 show the positions of the hydrogen atoms in the cellulose monomer available for substitution by the substituent.

The substituted cellulose comprises at least one glucose unit of its backbone which is substituted. Suitable substituents may be selected from the group consisting of branched, linear or cyclic, substituted or not substituted, saturated or unsaturated alkyl, amine (primary, secondary, tertiary), ammonium salt, amide, urethane, alcohol, carboxylic acid, tosylate, sulfonate, sulfate, nitrate, phosphate, silicone, and mixtures thereof.

The substitution may take place on any hydroxyl group of the glucose unit. For example, in the case of a glucose unit linked by β-1,4 linkage, as shown in figure (I), the substitution can take place in position 2, 3 and/or 6 of the glucose unit. The hydroxyl group —OH of the glucose may be substituted with a —O—R or —O—C(=O)—R group.

R may be an anionic, a cationic or a non-ionic group. R may be selected from the group consisting of: $R_1$, $N(R_2)(R_3)$, silicone moiety, $SO_3^-$, $PO_3^-$, with $R_2$ and $R_3$ being independently of each other an hydrogen atom or a $C_{1-6}$ alkyl and $R_1$ being a linear or branched, typically linear, saturated or unsaturated, typically saturated, substituted or unsubstituted, typically substituted, cyclic or acyclic, typically acyclic, aliphatic or aromatic, typically aliphatic, $C_1$-$C_{300}$, typically $C_1$-$C_{30}$, $C_1$-$C_{12}$, or $C_1$-$C_6$ hydrocarbon radical which hydrocarbon backbone may be interrupted by a heteroatom chosen form O, S, N and P. $R_1$ may be substituted by one or more radical selected from amino (primary, secondary, or tertiary), amido, —OH, —CO—$OR_4$, —$SO_3^-$, $R_4$, —CN, and —CO—$R_4$, where $R_4$ represents a hydrogen atom or an alkali metal, preferably a sodium or potassium, ion.

R may be one following anionic groups, in its acid or salt form, preferably sodium (given here) or potassium salt form:
-T-$CO_2$Na
-T-$SO_3$Na
—$PO_3$Na
—$SO_3$Na Wherein T is a $C_{1-6}$ alkyl, more preferably $C_{1-4}$ alkyl.

The R substituent may be the following cationic group:

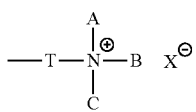

Wherein T is a $C_{1-6}$ alkyl, or $CH_2CH(OH)CH_2$, each A, B, and C is $C_{1-6}$ alkyl or hydroxy-$C_{1-6}$ alkyl, X is a counterion such as halide or tosylate.

R may be one following non-ionic groups:
-A
-T-OH
-T-CN
—C(=O)A
—C(=O)$NH_2$
—C(=O)NHA
—C(=O)N(A)B
—C(=O)OA
—$(CH_2CH_2CH_2O)_n$Z
—$(CH_2CH_2O)_n$Z
—$(CH_2CH(CH_3)O)_n$Z
—$(CH_2O)_n$Z Wherein: A and B are $C_{1-30}$ alkyl; T is $C_{1-6}$ alkyl; n=1 to 100; Z is H or $C_{1-6}$ alkyl.

R may be a hydroxyalkyl, carboxyalkyl, or sulfoalkyl group or a salt thereof. R may represent a hydroxy $C_{1-4}$ alkyl, such as a 5-hydroxymethyl group, a carboxy $C_{1-6}$ alkyl, such as a carboxy $C_{1-4}$ alkyl group, or a sulfo-$C_{2-4}$ alkyl, such as a sulfoethyl group, a $C_1$-$C_{30}$ alkanoyl or a salt (for example a sodium salt) thereof.

In exemplary embodiments, —O—R represents a group selected from —O—$CH_2$OH, —O—$CH_2CH_2SO_3$H, —O—$CH_2$—$CO_2$H, —O—CO—$CH_2CH_2CO_2$H, and salt (for example a sodium salt) thereof. Preferably, the substituent is a carboxymethyl group.

The substituent may be a benefit group, suitable benefit groups include perfumes, perfume particles, enzymes, fluorescent brighteners, oil repellent agents, water repellent agents, soil release agents, soil repellent agents, dyes including fabric renewing dyes, hueing dyes, dye intermediates, dye fixatives, lubricants, fabric softeners, photofading inhibitors, antiwrinkle/ironing agents, shape retention agents, UV absorbers, sunscreens, antioxidants, crease resistant agents, antimicrobial agents, skin benefit agents, antifungal agents, insect repellents, photobleaches, photoinitiators, sensates, enzyme inhibitors, bleach catalysts, odor neutralizing agents, pheromones, and mixtures thereof.

The substituted cellulose has a DS of from 0.01 to 0.99.

As those of skill in the art of cellulosic polymers chemistry, recognize, the term "degree of substitution" (or DS) refers to average degree of substitution of the functional groups on the cellulose units of the cellulose backbone. Thus, as each of the glucose unit of the cellulose backbone comprises three hydroxyl groups, the maximum degree of substitution of the substituted cellulose is 3. DS values do not generally relate to the uniformity of substitution of chemical groups along the cellulose backbone and are not related to the molecular weight of the cellulose backbone. The degree of substitution of the substituted cellulose may be of at least 0.02, or 0.05, in particular of at least 0.10, or 0.20, or even 0.30. Typically, the degree of substitution of the cellulose backbone is from 0.50 to 0.95, in particular from 0.55 to 0.90, or from 0.60 to 0.85, or even from 0.70 to 0.80.

The methods to measure the DS may vary as a function of the substituent. The skilled person knows or may determine how to measure the degree of substitution of a given substituted cellulose. By way of example, the method to measure the DS of a carboxymethylcellulose is disclosed thereafter.

Test Method 1: Evaluation of CMC Polymer Degree of Substitution (DS)

The DS was determined by igniting CMC to ash at high temperature (650° C.) for 45 minutes in order to remove all the organic material. The remaining inorganic ashes were dissolved in distilled water and methyl red added. The sample was titrated with 0.1M hydrochloric acid until the solution turned pink. The DS was calculated from the amount of titrated acid (b ml) and the amount of CMC (G g) using the formula below.

$$DS=0.162*\{(0.1*b/G)/[1-(0.08*0.1*(b/G)]\}$$

Alternatively, the DS of a substituted cellulose may be measured by conductimetry or $^{13}$C NMR. Experimental protocols for both approaches are given in D. Capitani et al, Carbohydrate Polymers, 2000, v 42, pp 283-286.

Degree of blockiness (DB): The substituted cellulose of the invention have a DB such as either DB+DS is at least of 1 or DB+2DS−$DS^2$ is of at least 1.20.

As those of skill in the art of cellulosic polymers chemistry recognise, the term "degree of blockiness" (DB) refers to the extent to which substituted (or unsubstituted) glucose units are clustered on the cellulose backbone. Substituted celluloses having a lower DB may be characterized as having a more even distribution of the unsubstituted glucose units along the cellulose backbone. Substituted celluloses having a higher DB may be characterized as having more clustering of the unsubstituted glucose units along the cellulose backbone.

More specifically, in a substituted cellulose comprising substituted and unsubstituted glucose units, the DB of the substituted cellulose is equal to B/(A+B), with A referring to the number of unsubstituted glucose units directly linked to at least one substituted glucose units, and B refers the number of unsubstituted glucose units not directly linked to a substituted glucose unit (i.e. only directly linked to unsubstituted glucose units).

Typically, the substituted cellulose has a DB of at least 0.35, or even from 0.40 to 0.90, from 0.45 to 0.80, or even from 0.50 to 0.70.

The substituted cellulose may have a DB+DS of at least 1. Typically the substituted cellulose has a DB+DS of from 1.05 to 2.00, or from 1.10 to 1.80, or from 1.15 to 1.60, or from 1.20 to 1.50, or even from 1.25 to 1.40.

The substituted cellulose having a DS comprised between 0.01 and 0.20 or between 0.80 to 0.99 may have a DB+DS of at least 1, typically of from 1.05 to 2.00, or from 1.10 to 1.80, or from 1.15 to 1.60, or from 1.20 to 1.50, or even from 1.25 to 1.40.

The substituted cellulose having a DS comprised between 0.20 and 0.80 may have a DB+DS of at least 0.85, Typically of from 0.90 to 1.80, or from 1.00 to 1.60, or from 1.10 to 1.50, or from 1.20 to 1.40.

The substituted cellulose may have a $DB+2DS-DS^2$ of at least 1.20. Typically the substituted cellulose has a $DB+2DS-DS^2$ of from 1.22 to 2.00, or from 1.24 to 1.90, or from 1.27 to 1.80, or from 1.30 to 1.70, or even from 1.35 to 1.60.

The substituted cellulose, having a DS comprised between 0.01 and 0.20, may have a $DB+2DS-DS^2$ of from 1.02 or 1.05 to 1.20.

The substituted cellulose, having a DS comprised between 0.20 and 0.40, may have a $DB+2DS-DS^2$ of from 1.05 or 1.10 to 1.40.

The substituted cellulose, having a DS comprised between 0.40 and 1.00 or between 0.60 and 1.00 or between 0,80 and 1.00, may have a $DB+2DS-DS^2$ of from 1.10 to 2.00, or from 1.20 to 1.90, or from 1.25 to 1.80, or from 1.20 to 1,70, or even from 1.35 to 1.60.

The methods to measure the DB may vary as a function of the substituent. The skilled person knows or may determine how to measure the degree of substitution of a given substituted cellulose. By way of example, a method to measure the DB of a substituted cellulose is disclosed thereafter.

Test Method 2: Evaluation of Substituted Cellulose Degree of Blockiness (DB)

In the case of a substituted cellulose, the DB may correspond to the amount (A) of non-substituted glucose units released after a specific enzymatic hydrolysis with the commercial endoglucanase enzyme (Econase CE, AB Enzymes, Darmstadt, Germany) divided by the total amount of non-substituted glucose units released after acid hydrolysis (A+B). The enzymatic activity is specific to non-substituted glucose units in the polymer chain that are directly bounded to another non-substituted glucose unit. Further explanation of substituted cellulose blockiness and measurement is provided in detail in V. Stigsson et al., Cellulose, 2006, 13, pp 705-712.

The enzymatic degradation is performed using the enzyme (Econase CE) in a buffer at pH 4.8 at 50° C. for 3 days. To 25 ml of substituted cellulose sample, 250 μL of enzyme is used. The degradation is stopped by heating the samples to 90° C. and keeping them hot for 15 minutes. The acid hydrolysis for both substitution pattern and blockiness is carried out in perchloric acid (15 min in 70% $HClO_4$ at room temperature and 3 hours in 6.4% $HClO_4$ at 120° C.). The samples are analysed using Anion Exchange Chromatography with Pulsed Amperiometric Detection (PAD detector: BioLC50 (Dionex, Sunnyvale, Calif., USA)). The HPAEC/PAD system is calibrated with C13 NMR. The monosaccharides are separated at 35° C. using a flow rate of 0.2 ml/min on a PA-1 analytical column using 100 mM NaOH as eluent with increasing sodium acetate (from 0 to 1M sodium acetate in 30 mins). Each sample is analysed three to five times and an average is calculated. The number of unsubstituted glucose that were directly linked to at least one substituted glucose (A), and the number of unsubstituted glucose that were not directly linked to a substituted glucose (B) are deduced and the DB of the substituted cellulose sample is calculated: DB=B/(A+B).

Viscosity of the substituted cellulose: The substituted cellulose has typically a viscosity at 25° C. when dissolved at 2% by weight in water of at least 100 mPa·s for example a viscosity of from 250 to 5000, or from 500 to 4000, from 1000 to 3000 or from 1500 to 2000 mPa·s. The viscosity of the cellulose may be measured according to the following test method.

Test Method 3: Evaluation of Substituted Cellulose Viscosity

A solution 2% by weight of the cellulose is prepared by dissolving the cellulose in water. The viscosity of the solution is determined using a Haake VT500 viscometer at a shear rate of 5 $s^{-1}$. at 25° C. Each measurement is done for 1 minute with 20 measuring points collected and averaged.

Molecular weight of the substituted cellulose: Typically, the celluloses of the present invention have a molecular weight in the range of from 10 000 to 10 000 000, for example from 20 000 to 1 000 000, typically from 50 000 to 500 000, or even from 60 000 to 150 000 g/mol.

Degree of polymerisation (DP) of the substituted cellulose: The substituted cellulose may have a total number of glucose units from 10 to 7000, or of at least 20. Suitable substituted celluloses that are useful in the present invention include celluloses with a degree of polymerization (DP) over 40, preferably from about 50 to about 100,000, more preferably from about 500 to about 50,000.

The total number of glucose units of the substituted cellulose is for example from 10 to 10 000, or 20 to 7500, for example 50 to 5000 and typically 100 to 3000, or from 150 to 2000.

Synthesis: The substituted cellulose used in the present invention may be synthesised by a variety of routes which are well known to those skilled in the art of polymer chemistry. For instance, carboxyalkyl ether-linked celluloses can be made by reacting a cellulose with a suitable haloalkanoic acid, carboxyalkyl ester-linked celluloses can be made by reacting a cellulose with a suitable anhydride, such as succinic anhydride, and sulfoalkyl ether-linked celluloses can be made by reacting a cellulose with a suitable alkenyl sulfonic acid.

The skilled person may obtain substituted cellulose with a higher degree of blockiness for example by choosing the solvent of the reaction, the rate of addition of the reactants, and the alkalinity of the medium during the substituted cellulose synthesis. The synthetic process can be optimised to control the DB, as discussed in V. Stigsson et al., Cellulose, 2006, 13, pp 705-712; N. Olaru et al, Macromolecular Chemistry & Physics, 2001, 202, pp 207-211; J. Koetz et al, Papier (Heidelburg), 1998, 52, pp 704-712; G. Mann et al, Polymer, 1998, 39, pp 3155-3165. Methods for producing carboxymethyl cellulose and hydroxyethyl cellulose having blocky characteristics are also disclosed in WO 2004/048418 (Hercules) and WO 06/088953 (Hercules).

Preferred substituted celluloses: The substituted cellulose may be selected from the group consisting of cellulose sulfate, cellulose acetate, sulfoethyl cellulose, cyanoethyl cellulose, methyl cellulose, ethyl cellulose, carboxymethylcellulose, hydroxyethylcellulose, and hydroxypropylcellulose. In particular the substituted cellulose is carboxymethylcellulose.

Non-limiting examples of suitable substituted cellulose derivatives are the sodium or potassium salts of carboxymethyl cellulose, carboxyethyl cellulose, sulfoethyl cellulose, sulfopropyl cellulose, cellulose sulfate, phosphorylated cellulose, carboxymethyl hydroxyethyl cellulose, carboxymethyl hydroxypropyl cellulose, sulfoethyl hydroxyethyl cellulose, sulfoethyl hydroxypropyl cellulose, carboxymethyl methyl hydroxyethyl cellulose, carboxymethyl methyl cellulose, sulfoethyl methyl hydroxyethyl cellulose, sulfoethyl methyl cellulose, carboxymethyl ethyl hydroxyethyl cellulose, carboxymethyl ethyl cellulose, sulfoethyl ethyl hydroxyethyl cellulose, sulfoethyl ethyl cellulose, carboxymethyl methyl hydroxypropyl cellulose, sulfoethyl methyl hydroxypropyl cellulose, carboxymethyl dodecyl cellulose, carboxymethyl dodecoyl cellulose, carboxymethyl cyanoethyl cellulose, and sulfoethyl cyanoethyl cellulose.

The cellulose may be a substituted cellulose substituted by 2 or more different substituents, such as methyl and hydroxyethyl cellulose.

Carboxylate polymer: Suitable carboxylate polymers include maleate/acrylate random copolymer or polyacrylate homopolymer. The carboxylate polymer may be a polyacrylate homopolymer having a molecular weight of from 4,000 Da to 9,000 Da, or from 6,000 Da to 9,000 Da. Other suitable carboxylate polymers are co-polymers of maleic acid and acrylic acid, and may have a molecular weight in the range of from 4,000 Da to 90,000 Da.

Amine polymer: Suitable amine polymers include polyethylene imine polymers, such as alkoxylated polyalkyleneimines, optionally comprising a polyethylene and/or polypropylene oxide block.

Cellulosic polymer: The composition can comprise cellulosic polymers, such as polymers selected from alkyl cellulose, alkyl alkoxyalkyl cellulose, carboxyalkyl cellulose, alkyl carboxyalkyl, and any combination thereof. Suitable cellulosic polymers are selected from carboxymethyl cellulose, methyl cellulose, methyl hydroxyethyl cellulose, methyl carboxymethyl cellulose, and mixtures thereof. The carboxymethyl cellulose can have a degree of carboxymethyl substitution from 0.5 to 0.9 and a molecular weight from 100,000 Da to 300,000 Da. Another suitable cellulosic polymer is hydrophobically modified carboxymethyl cellulose, such as Finnfix SH-1 (CP Kelco). A suitable substituted cellulosic polymer is carboxymethylcellulose. Another suitable cellulosic polymer is cationically modified hydroxyethyl cellulose.

Dye transfer inhibitor polymer: Suitable dye transfer inhibitor (DTI) polymers include polyvinyl pyrrolidone (PVP), vinyl co-polymers of pyrrolidone and imidazoline (PVPVI), polyvinyl N-oxide (PVNO), and any mixture thereof.

Hexamethylenediamine derivative polymers: Suitable polymers include hexamethylenediamine derivative polymers, typically having the formula:

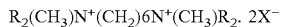

$$R_2(CH_3)N^+(CH_2)6N^+(CH_3)R_2 \cdot 2X^-$$

wherein $X^-$ is a suitable counter-ion, for example chloride, and R is a poly(ethylene glycol) chain having an average degree of ethoxylation of from 20 to 30. Optionally, the poly(ethylene glycol) chains may be independently capped with sulphate and/or sulphonate groups, typically with the charge being balanced by reducing the number of $X^-$ counter-ions, or (in cases where the average degree of sulphation per molecule is greater than two), introduction of $Y^+$ counter-ions, for example sodium cations.

Builder: Suitable builders include zeolites, phosphates, citrates, and any combination thereof.

Zeolite builder: The composition may be substantially free of zeolite builder. Substantially free of zeolite builder typically means comprises from 0 wt % to 10 wt %, zeolite builder, or to 8 wt %, or to 6 wt %, or to 4 wt %, or to 3 wt %, or to 2 wt %, or even to 1 wt % zeolite builder. Substantially free of zeolite builder preferably means "no deliberately added" zeolite builder. Typical zeolite builders include zeolite A, zeolite P, zeolite MAP, zeolite X and zeolite Y.

Phosphate builder: The composition may be substantially free of phosphate builder. Substantially free of phosphate builder typically means comprises from 0 wt % to 10 wt % phosphate builder, or to 8 wt %, or to 6 wt %, or to 4 wt %, or to 3 wt %, or to 2 wt %, or even to 1 wt % phosphate builder. Substantially free of zeolite builder preferably preferably means "no deliberately added" phosphate builder. A typical phosphate builder is sodium tri-polyphosphate (STPP).

Citrate: A suitable citrate is sodium citrate, However, citric acid may also be incorporated into the composition, which can form citrate in the wash liquor.

Buffer and alkalinity source: Suitable buffers and alkalinity sources include carbonate salts and/or silicate salts and/or double salts such as burkeitte.

Carbonate salt: A suitable carbonate salt is sodium carbonate and/or sodium bicarbonate. The composition may comprise bicarbonate salt. It may be suitable for the composition to comprise low levels of carbonate salt, for example, it may be suitable for the composition to comprise from 0 wt % to 10 wt % carbonate salt, or to 8 wt %, or to 6 wt %, or to 4 wt %, or to 3 wt %, or to 2 wt %, or even to 1 wt % carbonate salt. The composition may even be substantially free of carbonate salt; substantially free means "no deliberately added".

The carbonate salt may have a weight average mean particle size of from 100 to 500 micrometers. Alternatively, the carbonate salt may have a weight average mean particle size of from 10 to 25 micrometers.

Silicate salt: The composition may comprise from 0 wt % to 20 wt % silicate salt, or to 15 wt %, or to 10 wt %, or to 5 wt %, or to 4 wt %, or even to 2 wt %, and may comprise from above 0 wt %, or from 0.5 wt %, or even from 1 wt % silicate salt. The silicate can be crystalline or amorphous. Suitable crystalline silicates include crystalline layered silicate, such as SKS-6. Other suitable silicates include 1.6R silicate and/or 2.0R silicate. A suitable silicate salt is sodium silicate. Another suitable silicate salt is sodium metasilicate.

Filler: The composition may comprise from 0 wt % to 70% filler. Suitable fillers include sulphate salts and/or bio-filler materials.

Sulphate salt: A suitable sulphate salt is sodium sulphate. The sulphate salt may have a weight average mean particle size of from 100 to 500 micrometers, alternatively, the sulphate salt may have a weight average mean particle size of from 10 to 45 micrometers.

Bio-filler material: A suitable bio-filler material is alkali and/or bleach treated agricultural waste.

Bleach: The composition may comprise bleach. Alternatively, the composition may be substantially free of bleach; substantially free means "no deliberately added". Suitable bleach includes bleach activators, sources of available oxygen, pre-formed peracids, bleach catalysts, reducing bleach, and any combination thereof. If present, the bleach, or any component thereof, for example the pre-formed peracid, may be coated, such as encapsulated, or clathrated, such as with urea or cyclodextrin.

Bleach activator: Suitable bleach activators include: tetraacetylethylenediamine (TAED); oxybenzene sulphonates such as nonanoyl oxybenzene sulphonate (NOBS), caprylamidononanoyl oxybenzene sulphonate (NACA-OBS), 3,5,5-trimethyl hexanoyloxybenzene sulphonate (Iso-NOBS), dodecyl oxybenzene sulphonate (LOBS), and any mixture thereof; caprolactams; pentaacetate glucose (PAG); nitrile quaternary ammonium; imide bleach activators, such as N-nonanoyl-N-methyl acetamide; and any mixture thereof.

Source of available oxygen: A suitable source of available oxygen (AvOx) is a source of hydrogen peroxide, such as percarbonate salts and/or perborate salts, such as sodium percarbonate. The source of peroxygen may be at least partially coated, or even completely coated, by a coating ingredient such as a carbonate salt, a sulphate salt, a silicate salt, borosilicate, or any mixture thereof, including mixed salts thereof. Suitable percarbonate salts can be prepared by a fluid bed process or by a crystallization process. Suitable perborate salts include sodium perborate mono-hydrate (PB1), sodium perborate tetra-hydrate (PB4), and anhydrous sodium perborate which is also known as fizzing sodium perborate. Other suitable sources of AvOx include persulphate, such as oxone. Another suitable source of AvOx is hydrogen peroxide.

Pre-formed peracid: A suitable pre-formed peracid is N,N-pthaloylamino peroxycaproic acid (PAP).

Bleach catalyst: Suitable bleach catalysts include oxaziridinium-based bleach catalysts, transition metal bleach catalysts and bleaching enzymes.

Oxaziridinium-based bleach catalyst: A suitable oxaziridinium-based bleach catalyst has the formula:

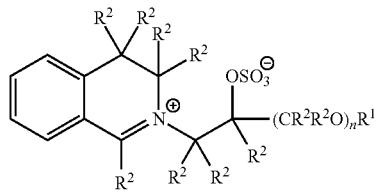

wherein: $R^1$ is selected from the group consisting of: H, a branched alkyl group containing from 3 to 24 carbons, and a linear alkyl group containing from 1 to 24 carbons; $R^1$ can be a branched alkyl group comprising from 6 to 18 carbons, or a linear alkyl group comprising from 5 to 18 carbons, $R^1$ can be selected from the group consisting of: 2-propylheptyl, 2-butyloctyl, 2-pentylnonyl, 2-hexyldecyl, n-hexyl, n-octyl, n-decyl, n-dodecyl, n-tetradecyl, n-hexadecyl, n-octadecyl, iso-nonyl, iso-decyl, iso-tridecyl and iso-pentadecyl; $R^2$ is independently selected from the group consisting of: H, a branched alkyl group comprising from 3 to 12 carbons, and a linear alkyl group comprising from 1 to 12 carbons; optionally $R^2$ is independently selected from H and methyl groups; and n is an integer from 0 to 1.

Transition metal bleach catalyst: The composition may include transition metal bleach catalyst, typically comprising copper, iron, titanium, ruthenium, tungsten, molybdenum, and/or manganese cations. Suitable transition metal bleach catalysts are manganese-based transition metal bleach catalysts.

Reducing bleach: The composition may comprise a reducing bleach. However, the composition may be substantially free of reducing bleach; substantially free means "no deliberately added". Suitable reducing bleach include sodium sulphite and/or thiourea dioxide (TDO).

Co-bleach particle: The composition may comprise a co-bleach particle. Typically, the co-bleach particle comprises a bleach activator and a source of peroxide. It may be highly suitable for a large amount of bleach activator relative to the source of hydrogen peroxide to be present in the co-bleach particle. The weight ratio of bleach activator to source of hydrogen peroxide present in the co-bleach particle can be at least 0.3:1, or at least 0.6:1, or at least 0.7:1, or at least 0.8:1, or at least 0.9:1, or at least 1.0:1.0, or even at least 1.2:1 or higher.

The co-bleach particle can comprise: (i) bleach activator, such as TAED; and (ii) a source of hydrogen peroxide, such as sodium percarbonate. The bleach activator may at least partially, or even completely, enclose the source of hydrogen peroxide.

The co-bleach particle may comprise a binder. Suitable binders are carboxylate polymers such as polyacrylate polymers, and/or surfactants including non-ionic detersive surfactants and/or anionic detersive surfactants such as linear $C_{11}$-$C_{13}$ alkyl benzene sulphonate.

The co-bleach particle may comprise bleach catalyst, such as an oxaziridium-based bleach catalyst.

Chelant: Suitable chelants are selected from: diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid), hydroxyethane di(methylene phosphonic acid), and any combination thereof. A suitable chelant is ethylene diamine-N'N'-disuccinic acid (EDDS) and/or hydroxyethane diphosphonic acid (HEDP). The laundry detergent composition may comprise ethylene diamine-N'N'-disuccinic acid or salt thereof. The ethylene diamine-N'N'-disuccinic acid may be in S,S enantiomeric form. The composition may comprise 4,5-dihydroxy-m-benzenedisulfonic acid disodium salt. Suitable chelants may also be calcium crystal growth inhibitors.

Calcium carbonate crystal growth inhibitor: The composition may comprise a calcium carbonate crystal growth inhibitor, such as one selected from the group consisting of: 1-hydroxyethanediphosphonic acid (HEDP) and salts thereof; N,N-dicarboxymethyl-2-aminopentane-1,5-dioic acid and salts thereof; 2-phosphonobutane-1,2,4-tricarboxylic acid and salts thereof; and any combination thereof.

Photobleach: Suitable photobleaches are zinc and/or aluminium sulphonated phthalocyanines.

Hueing agent: The hueing agent (also defined herein as hueing dye) is typically formulated to deposit onto fabrics from the wash liquor so as to improve fabric whiteness perception. The hueing agent is typically blue or violet. It may be suitable that the hueing dye(s) have a peak absorption wavelength of from 550 nm to 650 nm, or from 570 nm to 630 nm. The hueing agent may be a combination of dyes which together have the visual effect on the human eye as a single dye having a peak absorption wavelength on polyester of from 550 nm to 650 nm, or from 570 nm to 630 nm. This may be provided for example by mixing a red and green-blue dye to yield a blue or violet shade.

Dyes are typically coloured organic molecules which are soluble in aqueous media that contain surfactants. Dyes maybe selected from the classes of basic, acid, hydrophobic, direct and polymeric dyes, and dye-conjugates. Suitable polymeric hueing dyes are commercially available, for example from Milliken, Spartanburg, S.C., USA.

Examples of suitable dyes are violet DD, direct violet 7, direct violet 9, direct violet 11, direct violet 26, direct violet 31, direct violet 35, direct violet 40, direct violet 41, direct violet 51, direct violet 66, direct violet 99, acid violet 50, acid blue 9, acid violet 17, acid black 1, acid red 17, acid blue 29, solvent violet 13, disperse violet 27 disperse violet 26, disperse violet 28, disperse violet 63 and disperse violet 77, basic blue 16, basic blue 65, basic blue 66, basic blue 67, basic blue 71, basic blue 159, basic violet 19, basic violet 35, basic violet 38, basic violet 48; basic blue 3, basic blue 75, basic blue 95, basic blue 122, basic blue 124, basic blue 141, thiazolium dyes, reactive blue 19, reactive blue 163, reactive blue 182, reactive blue 96, Liquitint® Violet CT (Milliken, Spartanburg, USA) and Azo-CM-Cellulose (Megazyme, Bray, Republic of Ireland). Other suitable hueing agents are hueing dye-photobleach conjugates, such as the conjugate of sulphonated zinc phthalocyanine with direct violet 99. A particularly suitable hueing agent is a combination of acid red 52 and acid blue 80, or the combination of direct violet 9 and solvent violet 13.

Brightener: Suitable brighteners are stilbenes, such as brightener 15. Other suitable brighteners are hydrophobic brighteners, and brightener 49. The brightener may be in micronized particulate form, having a weight average particle size in the range of from 3 to 30 micrometers, or from 3 micrometers to 20 micrometers, or from 3 to 10 micrometers. The brightener can be alpha or beta crystalline form.

Enzyme: Suitable enzymes include proteases, amylases, cellulases, lipases, xylogucanases, pectate lyases, mannanases, bleaching enzymes, cutinases, and mixtures thereof.

For the enzymes, accession numbers and IDs shown in parentheses refer to the entry numbers in the databases Genbank, EMBL and/or Swiss-Prot. For any mutations, standard 1-letter amino acid codes are used with a * representing a deletion. Accession numbers prefixed with DSM refer to micro-organisms deposited at Deutsche Sammlung von Mikroorganismen and Zellkulturen GmbH, Mascheroder Weg 1b, 38124 Brunswick (DSMZ).

Protease. The composition may comprise a protease. Suitable proteases include metalloproteases and/or serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, Bacillus alkalophilus* (P27963, ELYA_BACAO), *Bacillus subtilis, Bacillus amyloliquefaciens* (P00782, SUBT_BACAM), *Bacillus pumilus* (P07518) and *Bacillus gibsonii* (DSM 14391).

(b) trypsin-type or chymotrypsin-type proteases, such as trypsin (e.g. of porcine or bovine origin), including the *Fusarium* protease and the chymotrypsin proteases derived from *Cellumonas* (A2RQE2).

(c) metalloproteases, including those derived from *Bacillus amyloliquefaciens* (P06832, NPRE_BACAM).

Suitable proteases include those derived from *Bacillus gibsonii* or *Bacillus Lentus* such as subtilisin 309 (P29600) and/or DSM 5483 (P29599).

Suitable commercially available protease enzymes include: those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark); those sold under the tradename Maxatase®, Maxacal®, Maxapem®, Properase®, Purafect®, Purafect Prime®, Purafect Ox®, FN3®, FN4®, Excellase® and Purafect OXP® by Genencor International; those sold under the tradename Opticlean® and Optimase® by Solvay Enzymes; those available from Henkel/Kemira, namely BLAP (P29599) having the following mutations S99D+S101 R+S103A+V104I+G159S), and variants thereof including BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D) all from Henkel/Kemira; and KAP (Bacillus alkalophilus subtilisin with mutations A230V+S256G+S259N) from Kao.

Amylase: Suitable amylases are alpha-amylases, including those of bacterial or fungal origin. Chemically or genetically modified mutants (variants) are included. A suitable alkaline alpha-amylase is derived from a strain of *Bacillus*, such as *Bacillus licheniformis, Bacillus amyloliquefaciens, Bacillus stearothermophilus, Bacillus subtilis,* or other *Bacillus* sp., such as *Bacillus* sp. NCIB 12289, NCIB 12512, NCIB 12513, sp 707, DSM 9375, DSM 12368, DSMZ no. 12649, KSM AP1378, KSM K36 or KSM K38. Suitable amylases include:

(a) alpha-amylase derived from Bacillus licheniformis (P06278, AMY_BACLI), and variants thereof, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444.

(b) AA560 amylase (CBU30457, HD066534) and variants thereof, especially the variants with one or more substitutions in the following positions: 26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, optionally that also contain the deletions of D183* and G184*.

(c) variants exhibiting at least 90% identity with the wild-type enzyme from Bacillus SP722 (CBU30453, HD066526), especially variants with deletions in the 183 and 184 positions.

Suitable commercially available alpha-amylases are Duramyl®, Liquezyme® Termamyl®, Termamyl Ultra®, Natalase®, Supramyl®, Stainzyme®, Stainzyme Plus®, Fungamyl® and BAN® (Novozymes A/S), Bioamylase® and variants thereof (Biocon India Ltd.), Kemzym® AT 9000 (Biozym Ges. m.b.H, Austria), Rapidase®, Purastar®, Optisize HT Plus®, Enzysize®, Powerase® and Purastar Oxam®, Maxamyl® (Genencor International Inc.) and KAM® (KAO, Japan). Suitable amylases are Natalase®, Stainzyme® and Stainzyme Plus®.

Cellulase: The composition may comprise a cellulase. Suitable cellulases include those of bacterial or fungal origin. Chemically modified or protein engineered mutants are included.

Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum*.

Commercially available cellulases include Celluzyme®, and Carezyme® (Novozymes A/S), Clazinase®, and Puradax HA® (Genencor International Inc.), and KAC-500 (B)® (Kao Corporation).

The cellulase can include microbial-derived endoglucanases exhibiting endo-beta-1,4-glucanase activity (E.C. 3.2.1.4), including a bacterial polypeptide endogenous to a member of the genus *Bacillus* sp. AA349 and mixtures thereof. Suitable endoglucanases are sold under the tradenames Celluclean® and Whitezyme® (Novozymes A/S, Bagsvaerd, Denmark).

The composition may comprise a cleaning cellulase belonging to Glycosyl Hydrolase family 45 having a molecular weight of from 17 kDa to 30 kDa, for example the endoglucanases sold under the tradename Biotouch® NCD, DCC and DCL (AB Enzymes, Darmstadt, Germany).

Suitable cellulases may also exhibit xyloglucanase activity, such as Whitezyme®.

Lipase. The composition may comprise a lipase. Suitable lipases include those of bacterial or fungal origin. Chemically modified or protein engineered mutants are included. Examples of useful lipases include lipases from *Humicola* (synonym *Thermomyces*), e.g., from *H. lanuginosa* (*T. lanuginosus*), or from *H. insolens*, a *Pseudomonas* lipase, e.g., from *P. alcaligenes* or *P. pseudoalcaligenes, P. cepacia, P. stutzeri, P. fluorescens, Pseudomonas* sp. strain SD 705, *P. wisconsinensis*, a *Bacillus* lipase, e.g., from *B. subtilis, B. stearothermophilus* or *B. pumilus*.

The lipase may be a "first cycle lipase", optionally a variant of the wild-type lipase from *Thermomyces lanuginosus* comprising T231R and N233R mutations. The wild-type sequence is the 269 amino acids (amino acids 23-291) of the Swissprot accession number Swiss-Prot O59952 (derived from *Thermomyces lanuginosus* (*Humicola lanuginosa*)). Suitable lipases would include those sold under the tradenames Lipex®, Lipolex® and Lipoclean® by Novozymes, Bagsvaerd, Denmark.

The composition may comprise a variant of *Thermomyces lanuginosa* (O59952) lipase having >90% identity with the wild type amino acid and comprising substitution(s) at T231 and/or N233, optionally T231R and/or N233R.

Xyloglucanase: Suitable xyloglucanase enzymes may have enzymatic activity towards both xyloglucan and amorphous cellulose substrates. The enzyme may be a glycosyl hydrolase (GH) selected from GH families 5, 12, 44 or 74. The glycosyl hydrolase selected from GH family 44 is particularly suitable. Suitable glycosyl hydrolases from GH family 44 are the XYG1006 glycosyl hydrolase from *Paenibacillus polyxyma* (ATCC 832) and variants thereof.

Pectate lyase: Suitable pectate lyases are either wild-types or variants of *Bacillus*-derived pectate lyases (CAF05441, AAU25568) sold under the tradenames Pectawash®, Pectaway® and X-Pect® (from Novozymes A/S, Bagsvaerd, Denmark).

Mannanase: Suitable mannanases are sold under the tradenames Mannaway® (from Novozymes A/S, Bagsvaerd, Denmark), and Purabrite® (Genencor International Inc., Palo Alto, Calif.).

Bleaching enzyme: Suitable bleach enzymes include oxidoreductases, for example oxidases such as glucose, choline or carbohydrate oxidases, oxygenases, catalases, peroxidases, like halo-, chloro-, bromo-, lignin-, glucose- or manganese-peroxidases, dioxygenases or laccases (phenoloxidases, polyphenoloxidases). Suitable commercial products are sold under the Guardzyme® and Denilite® ranges from Novozymes. It may be advantageous for additional organic compounds, especially aromatic compounds, to be incorporated with the bleaching enzyme; these compounds interact with the bleaching enzyme to enhance the activity of the oxidoreductase (enhancer) or to facilitate the electron flow (mediator) between the oxidizing enzyme and the stain typically over strongly different redox potentials.

Other suitable bleaching enzymes include perhydrolases, which catalyse the formation of peracids from an ester substrate and peroxygen source. Suitable perhydrolases include variants of the *Mycobacterium smegmatis* perhydrolase, variants of so-called CE-7 perhydrolases, and variants of wild-type subtilisin Carlsberg possessing perhydrolase activity.

Cutinase: Suitable cutinases are defined by E.C. Class 3.1.1.73, optionally displaying at least 90%, or 95%, or most optionally at least 98% identity with a wild-type derived from one of *Fusarium solani, Pseudomonas Mendocina* or *Humicola Insolens*.

Identity. The relativity between two amino acid sequences is described by the parameter "identity". For purposes of the present invention, the alignment of two amino acid sequences is determined by using the Needle program from the EMBOSS package (http://emboss.org) version 2.8.0. The Needle program implements the global alignment algorithm described in Needleman, S. B. and Wunsch, C. D. (1970) J. Mol. Biol. 48, 443-453. The substitution matrix used is BLOSUM62, gap opening penalty is 10, and gap extension penalty is 0.5.

Fabric-softener: Suitable fabric-softening agents include clay, silicone and/or quaternary ammonium compounds. Suitable clays include montmorillonite clay, hectorite clay and/or laponite clay. A suitable clay is montmorillonite clay. Suitable silicones include amino-silicones and/or polydimethylsiloxane (PDMS). A suitable fabric softener is a particle comprising clay and silicone, such as a particle comprising montmorillonite clay and PDMS.

Flocculant: Suitable flocculants include polyethylene oxide; for example having an average molecular weight of from 300,000 Da to 900,000 Da.

Suds suppressor: Suitable suds suppressors include silicone and/or fatty acid such as stearic acid.

Perfume: Suitable perfumes include perfume microcapsules, polymer assisted perfume delivery systems including Schiff base perfume/polymer complexes, starch-encapsulated perfume accords, perfume-loaded zeolites, blooming perfume accords, and any combination thereof. A suitable perfume microcapsule is melamine formaldehyde based, typically comprising perfume that is encapsulated by a shell comprising melamine formaldehyde. It may be highly suitable for such perfume microcapsules to comprise cationic and/or cationic precursor material in the shell, such as polyvinyl formamide (PVF) and/or cationically modified hydroxyethyl cellulose (catHEC).

Aesthetic: Suitable aesthetic particles include soap rings, lamellar aesthetic particles, geltin beads, carbonate and/or sulphate salt speckles, coloured clay particles, and any combination thereof.

Method of laundering fabric: The method of laundering fabric typically comprises the step of contacting the composition to water to form a wash liquor, and laundering fabric in said wash liquor, wherein typically the wash liquor has a temperature of above 0° C. to 90° C., or to 60° C., or to 40° C., or to 30° C., or to 20° C., or to 10° C., or even to 8° C. The fabric may be contacted to the water prior to, or after, or simultaneous with, contacting the laundry detergent composition with water. The composition can be used in pre-treatment applications.

Typically, the wash liquor is formed by contacting the laundry detergent to water in such an amount so that the concentration of laundry detergent composition in the wash liquor is from above 0 g/l to 5 g/l, or from 1 g/l, and to 4.5 g/l, or to 4.0 g/l, or to 3.5 g/l, or to 3.0 g/l, or to 2.5 g/l, or even to 2.0 g/l, or even to 1.5 g/l.

The method of laundering fabric may be carried out in a top-loading or front-loading automatic washing machine, or can be used in a hand-wash laundry application. In these applications, the wash liquor formed and concentration of laundry detergent composition in the wash liquor is that of the main wash cycle. Any input of water during any optional rinsing step(s) is not included when determining the volume of the wash liquor.

The wash liquor may comprise 40 litres or less of water, or 30 litres or less, or 20 litres or less, or 10 litres or less, or 8 litres or less, or even 6 litres or less of water. The wash liquor may comprise from above 0 to 15 litres, or from 2 litres, and to 12 litres, or even to 8 litres of water.

Typically from 0.01 kg to 2 kg of fabric per litre of wash liquor is dosed into said wash liquor. Typically from 0.01 kg, or from 0.05 kg, or from 0.07 kg, or from 0.10 kg, or from 0.15 kg, or from 0.20 kg, or from 0.25 kg fabric per litre of wash liquor is dosed into said wash liquor.

Optionally, 50 g or less, or 45 g or less, or 40 g or less, or 35 g or less, or 30 g or less, or 25 g or less, or 20 g or less, or even 15 g or less, or even 10 g or less of the composition is contacted to water to form the wash liquor.

EXAMPLES

Example 1

Suitable Granular Laundry Detergent Compositions

| Ingredient | Amount (in wt %) |
|---|---|
| Anionic detersive surfactant (such as alkyl benzene sulphonate, alkyl ethoxylated sulphate and mixtures thereof) | from 8 wt % to 15 wt % |
| Non-ionic detersive surfactant (such as alkyl ethoxylated alcohol) | from 0.5 wt % to 4 wt % |
| Cationic detersive surfactant (such as quaternary ammonium compounds) | from 0 to 4 wt % |
| Other detersive surfactant (such as zwiterionic detersive surfactants, amphoteric surfactants and mixtures thereof) | from 0 wt % to 4 wt % |
| Co-polymers (comprising carboxyl group monomers and sulfonate group monomers and ether group monomers as defined by the present invention) | from 0.1 wt % to 4 wt % |
| Random graft co-polymer (comprising a polyethylene glycol backbone and polyvinyl acetate side chains as defined by the present invention) | from 0.1 wt % to 4 wt % |
| Polyester soil release polymer (such as Repel-o-tex and/or Texcare polymers, having a structure as defined by the present invention) | from 0.1 to 3 wt % |
| Cellulosic polymer (such as carboxymethyl cellulose, having a degree of blockiness and a degree of substitution as defined by the present invention) | from 0.1 wt % to 2 wt % |
| Other polymer (such as amine polymers, dye transfer inhibitor polymers, hexamethylenediamine derivative polymers, and mixtures thereof) | from 0 wt % to 4 wt % |
| Zeolite builder and phosphate builder (such as zeolite 4A and/or sodium tripolyphosphate) | from 0 wt % to 4 wt % |
| Other builder (such as sodium citrate and/or citric acid) | from 0 wt % to 3 wt % |
| Carbonate salt (such as sodium carbonate and/or sodium bicarbonate) | from 15 wt % to 30 wt % |
| Silicate salt (such as sodium silicate) | from 0 wt % to 10 wt % |
| Filler (such as sodium sulphate and/or bio-fillers) | from 10 wt % to 40 wt % |
| Source of available oxygen (such as sodium percarbonate) | from 10 wt % to 20 wt % |
| Bleach activator (such as tetraacetylethylene diamine (TAED) and/or nonanoyloxybenzenesulphonate (NOBS)) | from 2 wt % to 8 wt % |
| Bleach catalyst (such as oxaziridinium-based bleach catalyst and/or transition metal bleach catalyst) | from 0 wt % to 0.1 wt % |
| Other bleach (such as reducing bleach and/or pre-formed peracid) | from 0 wt % to 10 wt % |
| Chelant (such as ethylenediamine-N'N'-disuccinic acid (EDDS) and/or hydroxyethane diphosphonic acid (HEDP)) | from 0.2 wt % to 1 wt % |
| Photobleach (such as zinc and/or aluminium sulphonated phthalocyanine) | from 0 wt % to 0.1 wt % |
| Bluing agent (such as a molecule according to any of the BA formulae given above, in particular BA10, BA20, BA51, | from 0.00001 wt % to 0.1 wt % |

-continued

| Ingredient | Amount (in wt %) |
|---|---|
| BA55, BA56, BA57, BA60, BA66, BA69, BA78) | |
| Hueing agent (such as direct violet 99, acid red 52, acid blue 80, direct violet 9, solvent violet 13 and any combination thereof) | from 0 wt % to 1 wt % |
| Brightener (such as brightener 15 and/or brightener 49) | from 0.1 wt % to 0.4 wt % |
| Protease (such as Savinase, Savinase Ultra, Purafect, FN3, FN4 and any combination thereof) | from 0.1 wt % to 0.4 wt % |
| Amylase (such as Termamyl, Termamyl ultra, Natalase, Optisize, Stainzyme, Stainzyme Plus and any combination thereof) | from 0.05 wt % to 0.2 wt % |
| Cellulase (such as Carezyme and/or Celluelean) | from 0.05 wt % to 0.2 wt % |
| Lipase (such as Lipex, Lipolex, Lipoclean and any combination thereof) | from 0.2 to 1 wt % |
| Other enzyme (such as xyloglucanase, cutinase, pectate lyase, mannanase, bleaching enzyme) | from 0 wt % to 2 wt % |
| Fabric softener (such as montmorillonite clay and/or polydimethylsiloxane (PDMS) | from 0 wt % to 4 wt % |
| Flocculant (such as polyethylene oxide) | from 0 wt % to 1 wt % |
| Suds suppressor (such as silicone and/or fatty acid) | from 0 wt % to 0.1 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as coloured soap rings and/or coloured speckles/noodles) | from 0 wt % to 1 wt % |
| Miscellaneous | balance |

Example 2

Benefit of Bluing Agent in Combination with Co-Polymer

Test Methods

Washing of Fabric: Each sample is run in a 96 well plate simulated washing system that uses magnetized bearings to simulate the agitation of a typical full scale washing machine using cotton fabric and the following conditions: 1826 ppm detergent concentration, 25° C., water hardness of 2.05 mM (2:1 $Ca^{2+}:Mg^{2+}$ molar ratio) and 3000 ppm Arizona test dust (supplied PTI, Powder Technology Inc) as a soil stress. Cotton fabrics are washed for 60 minutes and dried in the dark under ambient conditions. For each wash condition, there are eight internal replicates per 96 well plate and 4 plates for a total of 32 replicates per wash condition.

When dry, L*, a* and b* and are measured on each 96 well plate spot using an Image Analysis Station. "L" is a measure of the amount of white or black in a sample; higher "L" values indicate a lighter colored sample. A measure of the amount of red or green in a sample is determined by "a*" values. A measure of the amount of blue or yellow in a sample is determined by "b*" values; lower (more negative) b* values indicate more blue on a sample.

The CIE WI can be calculated from the L*, a* and b* values by the following conversion:

$$CIE\ WI = (100*((L*+16)/116)^3) + 800*(0.313776034 - ((94.825*(((a*/500) + (((100*((L*+a*)/116)^3)/100)^0.3333))^3))/((100*((L*+a*)/116)^3) + (94.825*(((I9/500) + (((100*((L*+a*)/116)^3)/100)^0.3333))^3)) + (107.381*(((((100*((L*+a*)/116)^3)/100)^0.3333) - b*/200)^3))))) + 1700*((0.330900114 - (100*((L*+a*)/)/116)^3)/((100*((L*+a*)/)/116)^3) + (94.825*(((I9/500) + (((100*((L*+a*)/)/116)^3)/100)^0.3333))^3)) + (107.381*(((((100*((L*+a*)/)/116)^3)/100)^0.3333) - b*/200)^3))))$$

Sample Laundry Detergent

The following laundry detergent composition is created for testing:

| Ingredient | Wash solution ppm |
|---|---|
| sodium linear alkylbenzene sulfonate | 200 |
| alkyl ethoxylate sulfate | 62 |
| dimethylhydroxyethyllaurel ammonium chloride | 9 |
| sodium carbonate | 285 |
| sodium sulphate | 1250 |
| polymer as specified | 30 |

When present, dye is incorporated at a level to provide a dye intensity of 0.05 AU in the wash solution. The dye is either a bluing agent having a structure in accordance with the present invention or violet DV9 dye (comparative example). The polymer is either a polyacrylate polymer of MW 4500 (PA, comparative example), polymer 1 (NP1, sulfonated, ethoxylated, carboxylated according to the present invention) and polymer 2 (NP2, sulfonated, ethoxylated, carboxylated according to the present invention).

Results

| Composition | Delta CIE WI (vs. dye alone) |
|---|---|
| DV9 + 30 ppm PA | +0.5 |
| DV9 + 30 ppm NP1 | −0.9 |
| DV9 + 30 ppm NP2 | +0.0 |
| Bluing Agent + 30 ppm PA | +1.0 |
| Bluing Agent + 30 ppm NP1 | +8.1 |
| Bluing Agent + 30 ppm NP2 | +12.8 |

CONCLUSION

Combining DV9 (comparative) with any of the polymers (PA, NP1, NP2) shows no significant increase in whiteness performance. In contrast, combining bluing agent in accordance with the present invention with polymers NP1 or NP2

(in accordance with the present invention) results in significantly increased whiteness performance. A difference of +2 CIE WI units is significantly noticeable by the human eye.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A laundry detergent composition comprising:
   (a) detersive surfactant;
   (b) bluing agent, wherein the bluing agent has the following structure:

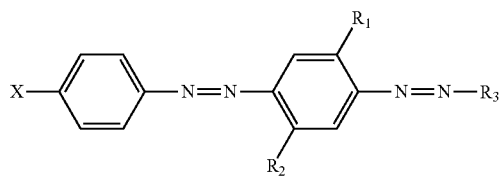

wherein:
   $R_1$ and $R_2$ are independently selected from the group consisting of: H; alkyl; alkoxy; alkyleneoxy; alkyl capped alkyleneoxy; urea; and amido;
   $R_3$ is a substituted aryl group;
   X is a substituted group comprising sulfonamide moiety and optionally an alkyl and/or aryl moiety, and wherein the substituent group comprises at least one alkyleneoxy chain that comprises at least four alkyleneoxy moieties; and
   (c) a clay and soil removal/anti-redeposition agent selected from the group consisting of:
      (I) co-polymers comprising:
         (i) from 50 to less than 98 wt % structural units derived from one or more monomers comprising carboxyl groups;
         (ii) from 1 to less than 49 wt % structural units derived from one or more monomers comprising sulfonate moieties; and
         (iii) from 1 to 49 wt % structural units derived from one or more types of monomers selected from ether bond-containing monomers represented by formulas (I) and (II):

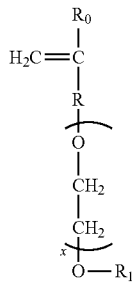

formula (I)

wherein in formula (I), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group;

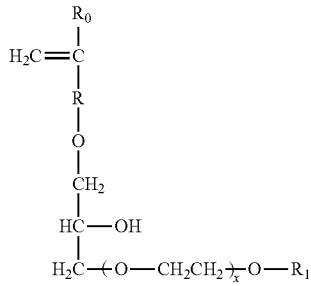

formula (II)

in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group;
      (II) any combination thereof; and
   (d) optionally, one or more additional laundry detergent ingredients.

2. A composition according to claim 1, wherein the bluing agent has the following structure:

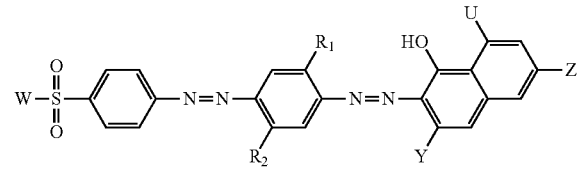

wherein:
$R_1$ and $R_2$ are independently selected from the group consisting of: H; alkyl; alkoxy; alkyleneoxy; alkyl capped alkyleneoxy; urea; and amido;
U is a hydrogen, a substituted or unsubstituted amino group;
W is a substituted group comprising an amino moiety and optionally an alkyl and/or aryl moiety, and wherein the substituent group comprises at least one alkyleneoxy chain that comprises at least four alkyleneoxy moieties;
Y is a hydrogen or a sulfonic acid moiety; and
Z is a sulfonic acid moiety or an amino group substituted with an aryl group.

3. A composition according to claim 2, wherein $R_1$ is an alkoxy group and $R_2$ is an alkyl group.

4. A composition according to claim 1, wherein the composition comprises C.I. fluorescent brightener 260 having the following structure:

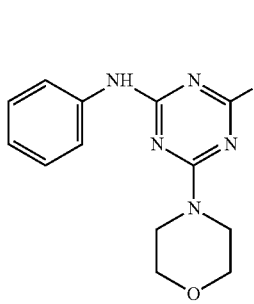
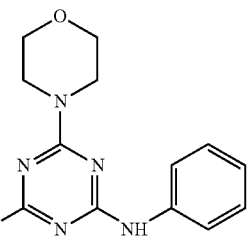

wherein the C.I. fluorescent brightener 260 is either:
(i) predominantly in alpha-crystalline form; or
(ii) predominantly in beta-crystalline form and having a weight average primary particle size of from 3 to 30 micrometers.

5. A composition according to claim 1, wherein the detersive surfactant comprises:
(i) alkoxylated alkyl sulphate anionic detersive surfactant having an average degree of alkoxylation of from 0.5 to 5; and/or
(ii) predominantly $C_{12}$ alkyl sulphate anionic detersive surfactant.

6. A composition according to claim 1, wherein the composition is substantially free of zeolite builder, and wherein the composition is substantially free of phosphate builder.

7. A composition according to claim 1, wherein the composition comprises an enzyme selected from the group consisting of:
(a) a variant of thermomyces lanuginosa lipase having >90% identity with the wild type amino acid and comprises substitution(s) at T231 and/or N233
(b) a cleaning cellulase belonging to Glycosyl Hydrolase family 45
(c) a variant of AA560 alpha amylase endogenous to Bacillus sp. DSM 12649 having:
(i) mutations at one or more of positions 9, 26, 149, 182, 186, 202, 257, 295, 299, 323, 339 and 345; and
(ii) one or more substitutions and/or deletions in the following positions: 118, 183, 184, 195, 320 and 458; and
(d) any combination thereof.

8. A composition according to claim 1, wherein the composition comprises an oxaziridinium-based bleach catalyst having the formula:

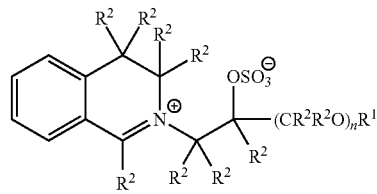

wherein: $R^1$ is selected from the group consisting of: H, a branched alkyl group containing from 3 to 24 carbons, and a linear alkyl group containing from 1 to 24 carbons; $R^2$ is independently selected from the group consisting of: H, a branched alkyl group comprising from 3 to 12 carbons, and a linear alkyl group comprising from 1 to 12 carbons; and n is an integer from 0 to 1.

9. A composition according to claim 1, wherein the composition comprises a perfume microcapsule.

10. A composition according to claim 1, wherein the composition is in solid form.

* * * * *